United States Patent [19]
Grochowski et al.

[11] Patent Number: 5,692,167
[45] Date of Patent: Nov. 25, 1997

[54] METHOD FOR VERIFYING THE CORRECT PROCESSING OF PIPELINED INSTRUCTIONS INCLUDING BRANCH INSTRUCTIONS AND SELF-MODIFYING CODE IN A MICROPROCESSOR

[75] Inventors: Edward T. Grochowski, San Jose; Donald B. Alpert, Santa Clara, both of Calif.

[73] Assignee: Intel Corporation, Santa Clara, Calif.

[21] Appl. No.: 697,028

[22] Filed: Aug. 19, 1996

Related U.S. Application Data

[63] Continuation of Ser. No. 354,453, Dec. 12, 1994, abandoned, which is a continuation of Ser. No. 938,387, Aug. 31, 1992, abandoned, which is a continuation-in-part of Ser. No. 922,855, Jul. 31, 1992, Pat. No. 5,442,756.

[51] Int. Cl.$^6$ ........................................................ G06F 9/38
[52] U.S. Cl. .......................... 395/567; 395/584; 395/586; 395/419
[58] Field of Search ........................ 395/375, 414, 395/416, 419, 418, 421.03, 567, 584, 585, 586, 587

[56] References Cited

U.S. PATENT DOCUMENTS

| | | | |
|---|---|---|---|
| 4,442,484 | 4/1984 | Childs, Jr. et al. | 395/490 |
| 4,725,947 | 2/1988 | Shonai et al. | 395/585 |
| 4,777,587 | 10/1988 | Case et al. | 395/582 |
| 4,847,753 | 7/1989 | Matsuo et al. | 395/585 |
| 4,864,493 | 9/1989 | Kishi | 395/421.11 |
| 4,876,639 | 10/1989 | Mensch, Jr. | 395/500 |
| 4,881,170 | 11/1989 | Morisada | 395/383 |
| 4,926,323 | 5/1990 | Baror et al. | 395/585 |
| 5,127,091 | 6/1992 | Boufarah et al. | 395/585 |
| 5,142,634 | 8/1992 | Fite et al. | 395/587 |
| 5,214,770 | 5/1993 | Ramanujan et al. | 395/450 |
| 5,226,130 | 7/1993 | Favor et al. | 395/585 |
| 5,261,071 | 11/1993 | Lyon | 395/467 |
| 5,265,213 | 11/1993 | Weiser et al. | 395/587 |
| 5,507,028 | 4/1996 | Liu | 395/383 |

OTHER PUBLICATIONS

Johnson, "Superscalar Microprocessor Design", Prentice-Hall, 1991 pp. 10–11, 19–22, 63–64, 75.

Crawford, John H., "The i486 CPU: Executing Instructions in One Clock Cycle", *IEEE Micro* Feb. 1990, pp. 27–36.

Lee et al, "Branch Prediction Strategies and Branch Target Buffer Design", *Computer*, Jan. 1984, pp. 6–22.

Lilja, David J., "Reducing the Branch Penalty in Pipelined Processors", *Computer*, Jul. 1988, pp. 47–55.

*Primary Examiner*—Parshotam S. Lall
*Assistant Examiner*—Viet Vu
*Attorney, Agent, or Firm*—Blakely, Sokoloff, Taylor & Zafman

[57] ABSTRACT

An apparatus and method for improving the performance of pipelined computer processors which have segment bits for specifying the operand size, the address size for memory reference, and the stack size, and which can run self-modifying code. The processor predicts segment bits based on previously used segment bits. Actual segment bits are later determined during execution of an instruction. The predicted segment bits are compared with the actual segment bits, and the pipeline is flushed if they do not match. Also, an instruction verification method is provided to determine if self-modifying code has modified instructions already in the pipeline. Upon execution of a write instruction, each instruction address in the pipeline is compared with the write address. If a match is found, the pipeline is flushed.

15 Claims, 14 Drawing Sheets

FIG. 4

|     |   | T1 | T2 | T3 | T4 | T5 | T6 | T7 | T8 |
|-----|---|----|----|----|----|----|----|----|----|
| PF  | U | I1 | I3 | I5 | I7 |    |    |    |    |
|     | V | I2 | I4 | I6 | I8 |    |    |    |    |
| D1  | U |    | I1 | I3 | I5 | I7 |    |    |    |
|     | V |    | I2 | I4 | I6 | I8 |    |    |    |
| D2  | U |    |    | I1 | I3 | I5 | I7 |    |    |
|     | V |    |    | I2 | I4 | I6 | I8 |    |    |
| EX  | U |    |    |    | I1 | I3 | I5 | I7 |    |
|     | V |    |    |    | I2 | I4 | I6 | I8 |    |
| WJ  | U |    |    |    |    | I1 | I3 | I5 | I7 |
|     | V |    |    |    |    | I2 | I4 | I6 | I8 |
| WJJ | U |    |    |    |    |    | I1 | I3 | I5 |
|     | V |    |    |    |    |    | I2 | I4 | I6 |

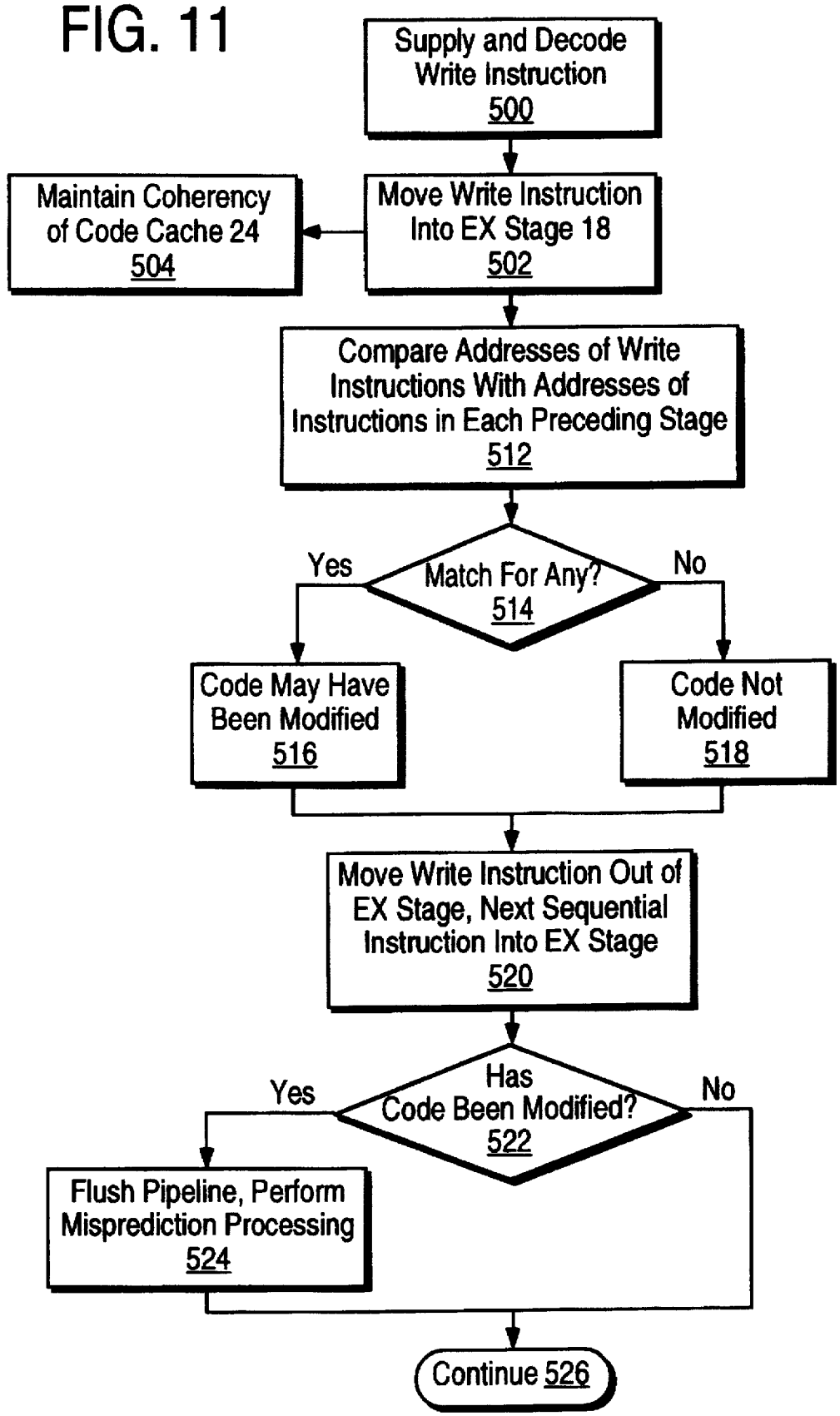

METHOD FOR VERIFYING THE CORRECT PROCESSING OF PIPELINED INSTRUCTIONS INCLUDING BRANCH INSTRUCTIONS AND SELF-MODIFYING CODE IN A MICROPROCESSOR

This is a continuation of application Ser. No. 08/354,453, filed Dec. 12, 1994, now abandoned, which is a continuation of application Ser. No. 07/938,387, filed Aug. 31, 1992, now abandoned, which is a continuation-in-part of application Ser. No. 07/922,855, filed Jul. 31, 1992, now issued U.S. Pat. No. 5,442,756, which is expressly incorporated by reference.

CROSS-REFERENCE TO RELATED APPLICATIONS

This application is related to the following copending, commonly assigned U.S. patent applications, which are incorporated by reference herein:

Ser. No. 07/625,761, filed Dec. 10, 1990, entitled "Extended Branch Target Apparatus for a Microprocessor", by Uri C. Weiser et al, U.S. Pat. No. 5,265,213.

Ser. No. 07/823,881, filed Jan. 23, 1992, entitled "Microprocessor with Apparatus for Parallel Execution of Instructions", by Edward T. Grochowski et al, now abandoned.

Ser. No. 07/831,942, filed Feb. 6, 1992, entitled "End Bit Markers for Instruction Decode", by Edward T. Grochowski et al, now abandoned.

Ser. No. 07/831,968, filed Feb. 6, 1992, entitled "Two Stage Window Multiplexors for Deriving Variable Length Instructions from a Stream of Instructions", by Edward T. Grochowski et al, now abandoned.

Ser. No. 07/831,825, filed Feb. 6, 1992, entitled "Rotators in Machine Instruction Length Calculation", by Edward T. Grochowski et al, now abandoned.

BACKGROUND OF THE INVENTION

1. Field of the Invention

The present invention relates to pipelined computer processors having branch prediction in which at least two data sizes are possible, and which can run self-modifying code. The invention is useful for single pipeline architectures and is also useful for superscalar pipelined architectures that have two or more pipelines for processing instructions.

2. Description of Related Art

Computer designers are continually attempting to make computers run faster for higher performance. A computer processor can process a series of instructions that are supplied to it from a source such as memory. One way to build faster computers is to design a computer that processes instructions faster. However, this task is often complicated by concerns other than faster processing. For example, a substantial commercial advantage may be available if a newly-designed processor is compatible with other, previously designed processors so that it has a base of application programs which it can run when it is introduced. This type of design for compatibility is exemplified by the microprocessors manufactured by INTEL Corporation including the 8086, 8088, 80286, i386™, and i486™ microprocessors hereinafter referred to as the INTEL microprocessors.

The first computers were designed for serial processing, in which they would completely process one instruction before processing the next instruction in the sequence. Newer computer architectures can process more than one instruction at at time. Although the newer architectures require greater design complexity and result in higher cost, the increased speed is highly advantageous. Major architectural advances that have increased performance include the use of pipelined and superscalar architectures.

A pipelined computer divides instruction processing into a series of steps, or stages, each of which is executable in a single clock cycle. In a non-pipelined computer, each instruction is processed until it is complete and only then does processing begin on the next instruction. In a pipelined computer, several sequential instructions are processed simultaneously in different stages of the pipeline. Processing in the different processing stages may proceed simultaneously in one clock period in separate portions of the computer.

The computers based on INTEL microprocessors, such as the i486™ microprocessors, pipeline instructions so that each stage of the operation is handled in one clock period. The stages into which instruction processing for an INTEL microprocessor are divided include a prefetch stage for fetching the instruction, a first and a second decode stage for decoding the instruction, an execution stage for executing the instruction, and a writeback stage for writing the results of the execution to the registers and memory for later use. Each of the steps is designed to require one clock period. Thus during a first clock period the prefetch portion of the computer fetches an instruction from storage and aligns it so that it is ready for decoding. During a second dock period, the prefetch portion of the computer fetches the next instruction from storage and aligns it, while the first stage decoder portion of the computer decodes the first instruction fetched. During the third dock period, the first instruction fetched is further decoded in the second stage decoder, the second instruction fetched is decoded in the first stage decoder, and another instruction is fetched and aligned in the prefetch stage. Pipelining continues through each of the stages including the execution stage and the writeback stage, and thus the overall speed of computer processing is significantly increased over a non-pipelined computer.

In a superscalar architecture, two or more instructions may be processed simultaneously in one stage. A superscalar computer has two or more processing paths that are capable of simultaneously executing instructions in parallel. In a scalar computer, the same type of instructions would be run serially. It should be apparent that if two or more instructions are run simultaneously, then the computer can process instructions faster.

If a branch instruction, such as a jump, return, or conditional branch is in the series of instructions, a pipelined computer will suffer a substantial performance penalty on any taken branch unless there is some form of branch prediction. One way to increase computer performance is to predict the outcome of a branch instruction, and insert the predicted instruction into the pipeline immediately following the branch instruction. If such a branch prediction mechanism is implemented in a microprocessor, then the penalty is avoided unless the branch is mispredicted. If a branch is mispredicted, then the pipeline is flushed and the correct instruction is inserted into the pipeline.

For compatibility with earlier INTEL microprocessors, both a 16-bit data size and a 32-bit data size must be accommodated. The INTEL 8086, 80186, and 80286 microprocessors use a 16-bit data size, but the i386™ microprocessor introduced a 32-bit data size for increased performance, which was continued in the i486™ microprocessor. Memory is divided into segments, and each segment has a default size for the operands of instructions, the addressing mode for memory references within the segment, and the stack. Details of the segmented memory configuration are available from many sources, for example, such details are described in Chapter 5, "Memory Management," of the i486™ *Processor Programmer's Reference Manual*, 1990, available from INTEL Corporation Literature Sales, P.O. Box 7641, Mt. Prospect, Ill. 60056-7641. Chapter 24 of the same publication, "Mixing 16-Bit and 32-Bit Code," includes a detailed explanation of the reasons for mixing 16-bit and 32-bit code, and provides programming guidelines.

In the i486™ microprocessor, which does not have branch prediction, an instruction assumes the default segment bits of the immediately preceding instruction for purposes of decoding and executing the instruction. Incorrect default segment bits are not a problem because any taken branch automatically flushes the pipeline, and thereby flushing any incorrectly decoded instructions. However, with the introduction of branch prediction, a problem arises if a branch is predicted outside of a segment (i.e., if a "far jump" is predicted). In that instance, the default segment bits may change. Therefore, some mechanism is needed to predict the default segment bits, and to verify that the prediction is correct.

Self-modifying code includes any sequence of instructions that writes data to a memory location and subsequently executes the data at that location as an instruction. Self-modifying code is necessary in any operating system to implement program loaders. It may also be found in breakpoint debuggers, fast BITBLT routines, certain copy-protection schemes under DOS, and other programs and code. In pipelined computers, self-modifying code could create a problem if the code modifies an instruction that has already been fetched into the pipeline. Unless this problem is addressed, the computer could execute the un-modified code. To avoid this problem, the INTEL x86 architecture has previously imposed some restrictions on self-modifying code for the i486™ microprocessor and previous families. After writing to memory, the programmer was required to execute a single jump instruction before the data (written to memory) appears in the code space. On the i486™ microprocessor the jump flushes the pipeline, discarding all prefetched and predecoded instructions. However, on the more advanced microprocessors having branch prediction, a taken jump does not necessarily flush the pipeline. Furthermore, the code and data caches are separate, and two macroinstructions may be executed simultaneously. Therefore, another approach is necessary to process self-modifying code.

SUMMARY OF THE INVENTION

The present invention provides an apparatus and method for ensuring that instructions in a pipeline have been correctly processed and also that the instructions have not been changed by the programmer subsequent to their insertion into the pipeline. In the described embodiment, two data sizes are specified by segment bits. The two data sizes include first data size and a second data size. In the event of a branch prediction to a location outside of a segment (i.e., a far jump), the data size is predicted to be the data size of the currently executing segment, and the predicted code is processed using the predicted data size. During processing, an actual data size and an actual target address are determined. If it is then determined that the predicted data size was incorrect but that the branch was correctly predicted, then the pipeline is flushed and misprediction processing begins to bring the actual target address into the pipeline, and the data size is updated to the actual data size.

The described embodiment also includes a mechanism for verifying that the instructions in the pipeline have not been modified subsequent to their insertion into the pipeline by self-modifying code. A control unit is provided that holds instruction pointers for each instruction in the pipeline. During execution of a write instruction, the destination address of the write instruction is compared with the address of the instructions in the pipeline. If a match is found, then the instruction likely has been modified by the write instruction, and the pipeline is flushed and misprediction processing begins to bring the instruction following the write instruction into the pipeline. Furthermore, a code cache is snooped during execution of a write instruction, and if the snoop hits an entry corresponding to the write address, then that cache line is marked invalid.

The described embodiment has two instruction processing paths, or "pipelines" and a branch instruction can be executed in either pipeline, subject to restrictions described further herein. In the first pipeline, the takenness and target of a branch instruction is known in the execution stage. In the second pipeline, the target of a branch instruction is known in the execution stage, but the takenness may not be known until after the execution stage. In order to allow a branch instruction in one of the pipelines to be paired with an instruction in the other pipeline, a way of handling branches that are resolved in one of the separate stages is provided. Furthermore, two sets of prefetch buffers are provided to allow branch prediction when multiple clock decoding is required by a multi-clock instruction.

"Branch prediction" is a means of speculatively filling a pipeline with instructions at the target of a branch before it is known whether the branch will be taken and before the target address is known. The present invention may be embodied in an apparatus for predicting a branch location in a sequence of Instructions in a superscalar microprocessor that has a first and second pipeline, either of which can execute a branch instruction. A branch target buffer is provided to store branch predictions that are supplied to an address selector for the prefetch unit, in response to an address in the pipeline indicative of a branch instruction. The branch target buffer includes a plurality of entries having a tag field for storing a tag indicative of the address of a branch instruction, an address field for storing a target address predicted for the branch instruction, and a history field for storing a history of the branch takenness. The history field may be dual ported for both reading and writing in a single clock cycle. Also, the tag field may store the address of an instruction preceding a branch instruction, rather than the address of the branch instruction itself.

The superscalar architecture of the preferred embodiment includes separate instruction paths through which instructions can flow in parallel. In the preferred embodiment, the microprocessor has two pipelines; i.e., each stage can obtain and process two instructions in parallel. A first pipeline includes means for decoding and executing a first set of instructions in the microprocessor, the first set including a branch instruction. The second pipeline includes means for decoding and executing a subset of the first set of instructions in the microprocessor, the subset including a branch instruction. Each of the pipeline stages may include a prefetch stage for fetching and buffering instruction code lines, a decode stage for receiving instruction code from the prefetch stage and decoding the instructions, and an execution stage including means for calculating an actual target address from a branch instruction. One or more stages may follow the execution stage. The preferred embodiment also has a writeback (WJ) stage, in which instructions that have been executed are enabled to modify the processor state and otherwise complete execution. A final, sixth stage is a post-writeback (WJJ) stage which is useful for storing the address of the previous instruction in the writeback stage. The post-writeback stage is useful, as will be described, to update and allocate entries in the branch target buffer.

To select an address to be fetched by the prefetch stage, a multiplexer selects between a next sequential code line, the predicted target address, and an actual target address. In order to verify that a predicted branch has actually been taken, a branch verification apparatus compares the actual target address computed in the execution stage with the address of the instruction in the stage following the branch instruction.

"Branch verification" is used to check that the architecturally correct instructions are in the execution stage. In the preferred embodiment, branch verification may occur in either of two stages, depending upon whether or not the branch instruction can be resolved in that stage. In this context, a branch instruction is "resolved" in the pipeline stage in which it is known whether or not a conditional branch has been taken, i.e., the stage in which the takenness of a branch is known. In other words, "to resolve" means to determine whether a conditional branch will be taken (thereby altering the control flow), or if the branch will not be taken, allowing control flow to pass to the next sequential instruction.

A branch instruction can be resolved in either the execution stage, or later, in a post-execution stage such as the writeback stage. During operation, it is likely that most branch instructions will be resolved in the execution stage. However, some types of branches, such as conditional branches in the second pipeline which are dependent upon the result of an instruction in the first pipeline, are not resolved until the post-execution stage. In order to optimize performance and allow a branch to be paired with another instruction upon which it depends, the branch verification apparatus verifies the correct branch prediction in both the execution stage and the post-execution stage. A method described herein includes branch verification in both the execution stage and a stage following the execution stage (a "post-execution" stage).

If the branch verification apparatus indicates that the incorrect instruction is following a branch instruction, then the pipeline is flushed in accordance with conventional techniques, and the correct target instruction is applied into the pipeline. A penalty in performance is paid when there has been a misprediction. However, the preferred embodiment optimizes the number of mispredictions, and the penalty for the misprediction.

The preferred embodiment has features that are useful for purposes including decoding and executing variable length instructions. Specifically, the tag in the branch target buffer refers to an instruction preceding a branch instruction. Due to the variable length of the instructions, the instruction pointer of the current instruction in the prefetch unit is not known until the preceding instruction is in the decode stage, because the prefetch stage does not have a byte granular decoder. By using the instruction preceding the branch instruction as a tag, a cycle loss is avoided if there is a branch prediction. In other words, using the previous instruction as a tag allows the target instruction to be placed into the pipeline immediately following the branch instruction. Furthermore, the entry in the buffer contains the address of the predicted instruction, but not the instruction code. The absence of the instruction code saves silicon space, reduces cost, and eliminates the need to keep the instructions in the branch target buffer consistent with memory.

In the preferred embodiment, there are two pipelines: a "u-pipeline" and a "v-pipeline". The tag is obtained from the u-pipeline only. If there is a branch instruction in the u-pipeline, then an instruction pairing rule prevents a branch from appearing in the v- pipeline. However, the instruction pairing rules permit a branch instruction in the v-pipeline if other instructions are in the u-pipeline, even if the outcome of the branch is dependent upon the outcome of the instruction in the u-pipeline.

In the preferred embodiment, two sets of buffers are provided in the prefetch unit. These buffers include a first prefetch buffer set and a second prefetch buffer set. Either set is selectable to supply instruction code. The two buffer set configuration is useful for continuing uninterrupted instruction flow. It is also useful when an instruction preceding a branch, or a branch instruction, requires additional code for its execution. Particularly, this configuration is useful for "prefixes" which are permitted in the instruction set of the preferred embodiment.

BRIEF DESCRIPTION OF THE DRAWINGS

FIG. 3A illustrates a D2 to EX verification method, and FIG. 3B illustrates an EX to WJ verification method.

FIG. 4 is a diagram illustrating instruction flow in a superscalar architecture.

FIG. 11 is a flow chart of operations of instruction verification, for verifying that a write instruction in the execution stage has not modified the code in the pipeline.

DETAILED DESCRIPTION OF THE PREFERRED EMBODIMENT

The invention is best understood by reference to the figures wherein like parts are designated with like numerals throughout. The description following the initial discussion describes instruction verification and segment bit verification with reference to FIGS. 8–11. The initial discussion, with reference to FIGS. 1–7, describes predicting and verifying a branch target address, which is also described in Ser. No. 07/922,855, Filed on Jul. 31, 1992, entitled "Branch Target Buffer for a Superscalar Computer Processor", U.S. Pat. No. 5,442,756.

General Description of Predicting and Verifying a Branch Target Address

Figure 1:
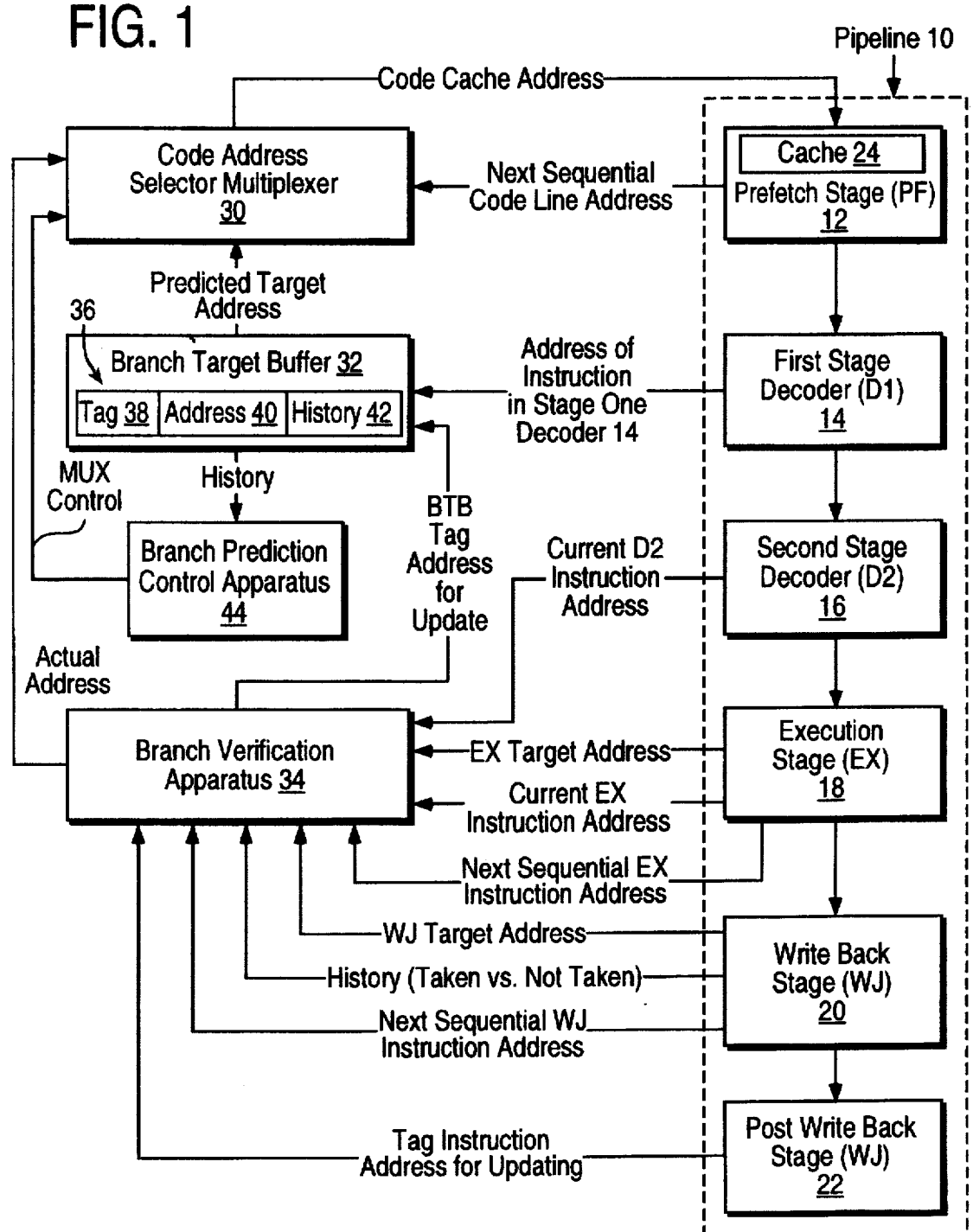
FIG. 1 is a block diagram of the pipeline, the branch target buffer, and related apparatus.

FIG. 1 is a block diagram illustrating an apparatus for predicting and verifying branch target addresses. On the right hand side of FIG. 1, a pipeline 10 is illustrated in dotted lines. The stages of the pipeline include a prefetch stage 12, a first stage decoder 14, a second stage decoder 16, an execution stage 18, a writeback stage 20 and a post-writeback stage 22. Each stage executes in a single clock cycle. The above stages are the specific stages implemented in the preferred embodiment which is described in greater detail below. In other embodiments, the number, or the name of the stages may vary. Furthermore, in the preferred embodiment, the architecture is a superscalar architecture. Thus, each stage may be able to process two or more instructions simultaneously. In the preferred embodiment, two parallel paths are provided for each stage, so that there is a dual decoder, a dual execution stage, a dual writeback stage, and a dual post-writeback stage. In other embodiments, more than two parallel paths may be provided for each stage. For ease of description, the following description of FIG. 1 assumes a single pipeline. It should be apparent to one skilled in the art that the description could also be applied to superscalar architectures.

The prefetch stage 12 buffers information including instruction code from a cache 24 that fetches instructions from memory and stores them for quick access. The instruction from the prefetch stage 12 is applied to the first stage decoder 14, which substantially decodes the instruction supplied to it. The second stage decoder 16 is used in the preferred embodiment for address generation. The execution stage 18 includes apparatus for executing the instruction. The writeback stage 20 includes apparatus for finalizing the executed instructions, including posting the results of the execution stage to the registers, and other tasks. The post-writeback stage 22 is used to store an instruction address, and is useful for updating the branch target buffer as will be described.

A code address selector multiplexer 30 is provided to supply an address to the pipeline 10. Specifically the address from the multiplexer 30 supplies the address of instruction code to be fetched in the next clock cycle. In the preferred embodiment, if the address has an entry in the code cache 24, then that instruction is supplied directly to the prefetch stage 12. If the instruction address is not already stored in the code cache 24, then a memory cycle is run to fetch the code into the code cache 24. The corresponding instruction is then supplied to the prefetch stage 12. The code address selector multiplexer 30 selects from inputs including a predicted target address from branch target buffer 32, a next sequential code line address from the prefetch stage 12, and an actual target address from the branch verification apparatus 34.

The branch target buffer 32 includes a plurality of entries, an exemplary one of which is shown as entry 36. The entry 36 includes a tag 38, an address 40, and history information 42. In the preferred embodiment the branch target buffer 32 includes 256 entries, it is 4-way set associative, it uses a random replacement policy, and it allocates entries for taken branches only. The apparatus also includes a branch prediction control apparatus 44 which is supplied with history information from the branch target buffer 32. Based upon the history information in the branch target buffer 32 for a selected entry, it controls the multiplexer 30 to select an address as will be explained further below.

The branch target buffer 32 also is connected to the first stage decoder 14, which supplies an address of the instruction in the first stage decoder 14. The address in the decoder 14 is compared against the tag 38. Specifically, the address of the instruction in the first stage decoder 14 is compared with the tags in the branch target buffer 32.

The branch verification apparatus 34 has a number of inputs which are useful for determining if the instruction following a branch instruction is the correct instruction as will be explained further below. The inputs to the branch verification apparatus 34 include a current D2 instruction address from the second stage decoder 16. The inputs also include, from the execution stage 18, an execution (Ex) target address, a current Ex instruction address, and the next sequential Ex instruction address. For purposes of definition, the letters "Ex" will be used to denote the address associated with the execution stage at a particular instant in time.

The branch verification apparatus 34 has inputs from the writeback stage 20, including a WJ target address, a next sequential WJ instruction address, and history information as to whether a branch has been taken or not. The branch verification apparatus 34 also has an input from the post-writeback stage which includes the tag for updating the instruction address.

Figure 2:
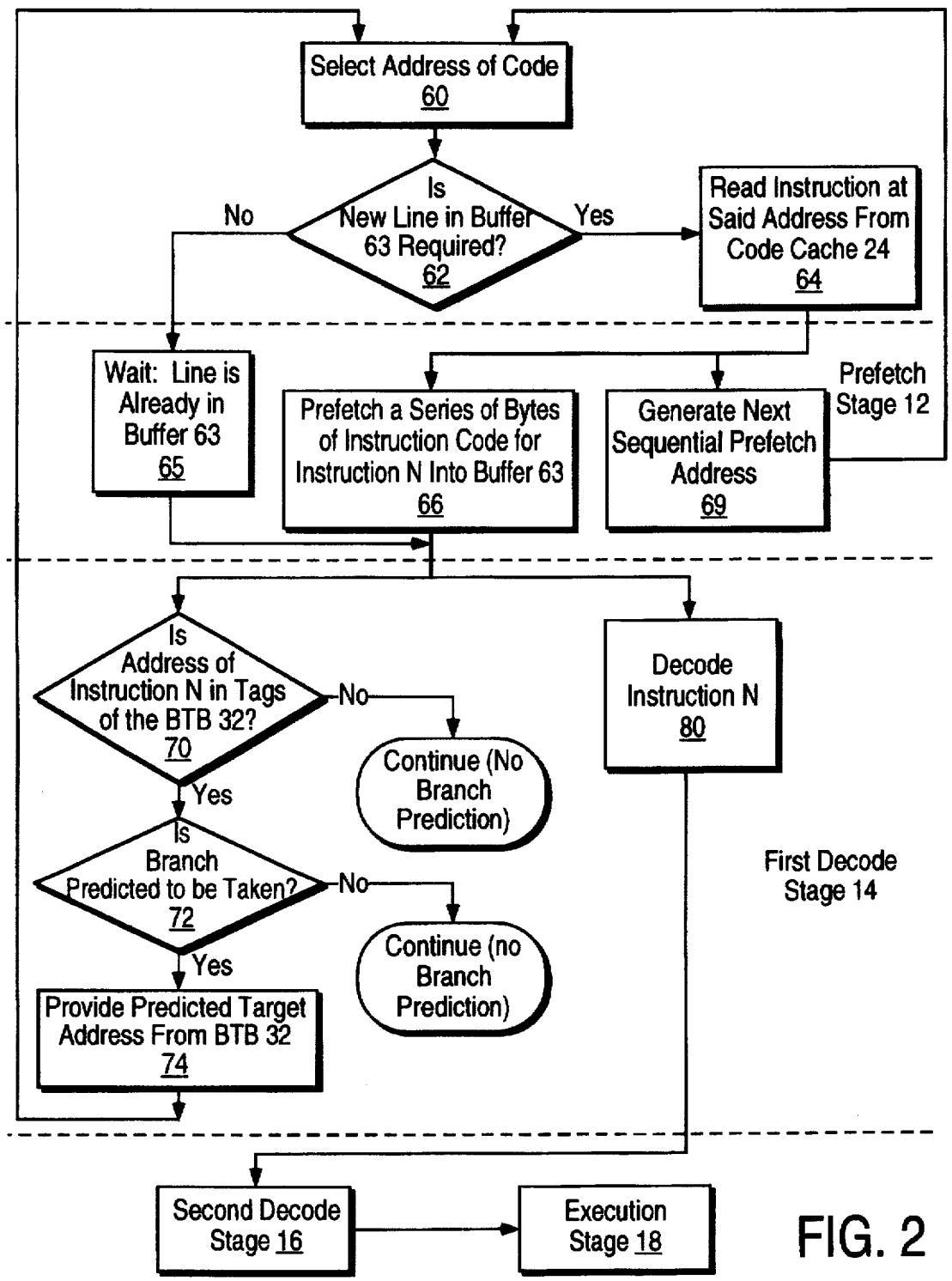
FIG. 2 is a flow chart illustrating operation of the branch prediction control apparatus.
Figure 3A:
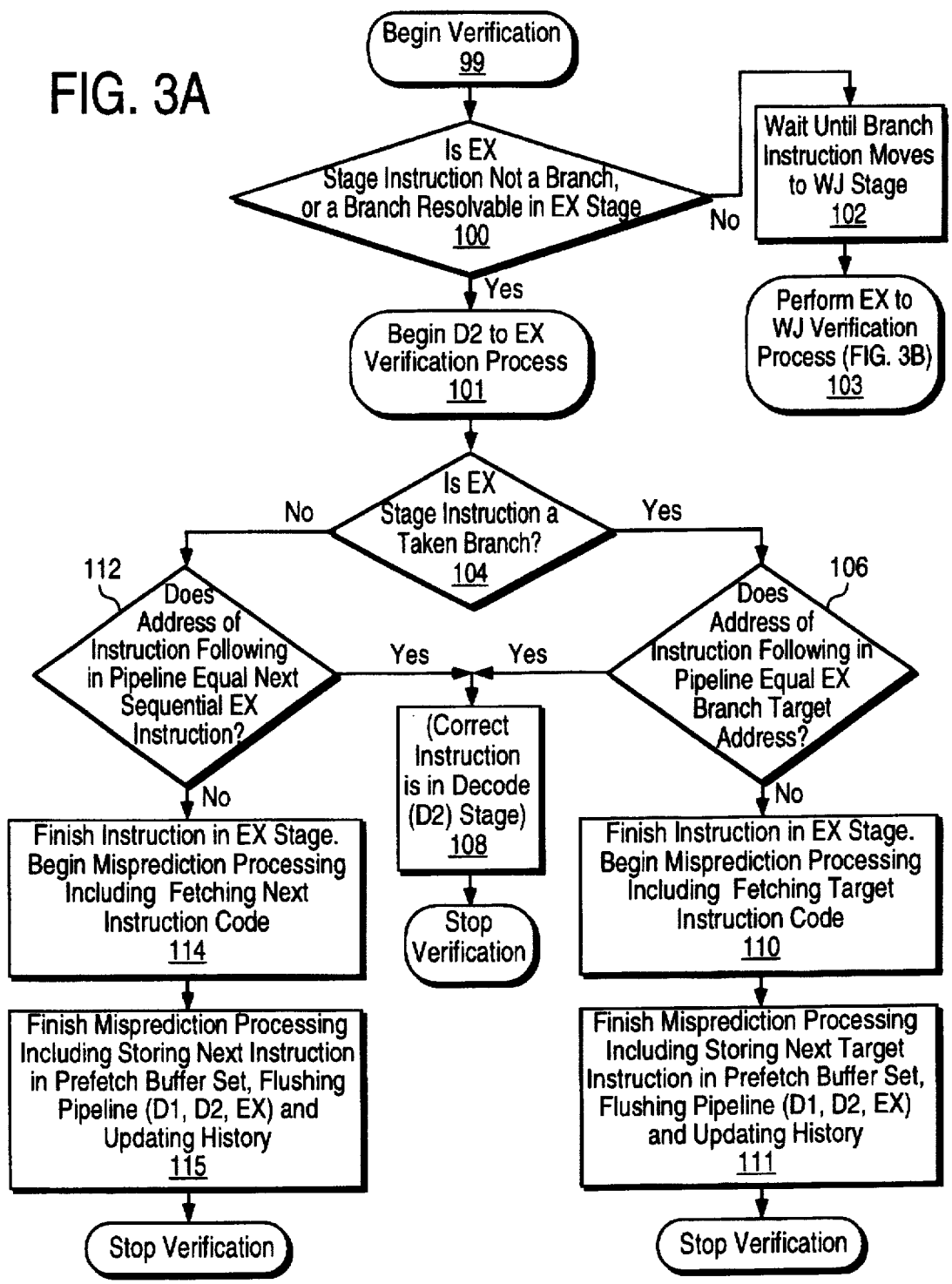
FIGS. 3A and 3B are flow charts illustrating operation of the branch verification method.
Figure 3B:
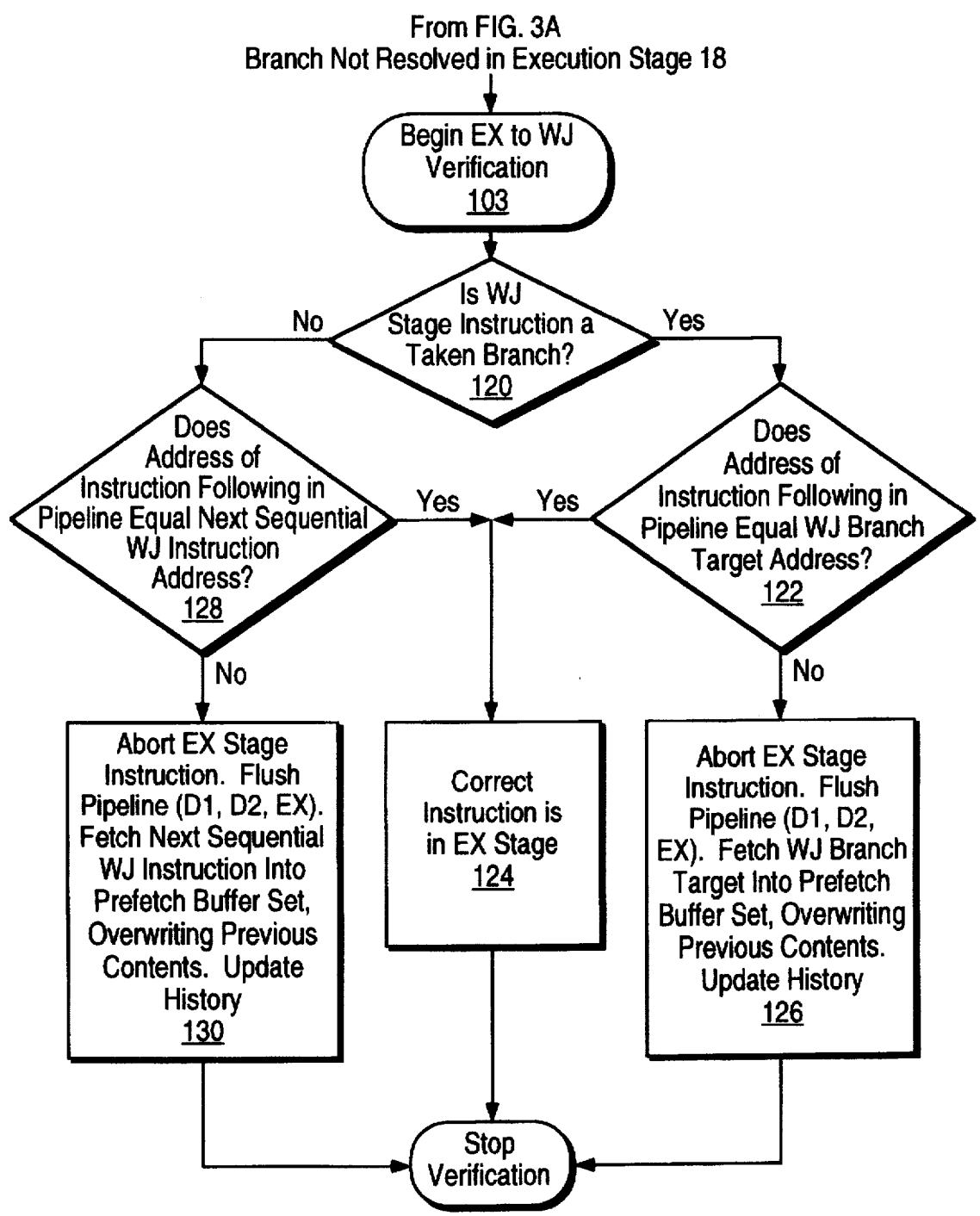

FIG. 2 is a flow chart that illustrates the branch prediction method of the present invention. FIGS. 3A and 3B are flow charts that illustrate the branch verification method. Beginning in FIG. 2, the address of the code is selected in a box 60. This address is then applied to a decision box 62. If a new line is required in a buffer 63 (see FIG. 5) in the prefetch stage 12, then the instruction at the new line is read into the code cache 24 as illustrated in a box 64. Then, operation moves to a box 69 in which the next sequential prefetch address is generated and applied to the box 60 which selects the code address. Returning to the decision 62, if no new line is needed, then it simply waits as illustrated in a box 65 because it is not necessary to read information into the prefetch stage 12. This method is useful due to the architecture of the preferred embodiment, in which the instructions are a variable length, and the buffers 63 within the prefetch stage 12 can store more than one instruction. These buffers 63 will be described in more detail with reference to FIG. 5.

If a new code line is required, then in the prefetch stage 12, as illustrated in a box 66, a series of bytes of instruction code are fetched into the buffers 63 to be available for supplying to the decode stage 14. It should be remembered that the preferred embodiment is a superscalar machine with dual pipelines, and the instruction code is supplied from the prefetch stage 12 into the decode stage 14 in parallel. In other words, two instructions are supplied into the decode stage 14, specifically into a dual decoder as described in the patent applications incorporated by reference herein.

In FIG. 2, the branch prediction method is performed after an instruction code is supplied into the decode stage 14 and proceeds in parallel with decoding. First as illustrated in a box 70, the address of the instruction is compared with the addresses of the tags in the branch target buffer 32. If there is no match then operation is continued without branch prediction. However if a match is found in the branch target buffer 32, then operation proceeds to a decision box 72 in which the history bits 42 are tested to determine whether or not the branch is predicted to be taken. The method for determining whether or not the branch is to be taken is described with reference to FIG. 7. If the branch is not predicted to be taken, then operation continues without branch prediction. However, if the branch is predicted to be taken, then as illustrated in the box 74 the predicted target address from the branch target buffer 32 is provided from the box 74 to the box 60 which selects the predicted target address of the code. Which of the addresses is actually selected by the box 60 depends upon whether or not the branch is predicted to be taken. This branch prediction is complete in one cycle, and proceeds in parallel with the first stage decoder 14 (FIG. 1).

Thus, in parallel with the branch prediction of the boxes 70, 72, and 74, the instruction N is decoded in the first stage, as illustrated in a box 80. Following the first decode stage 14 is the second stage decoder 16 and the execution stage 18, in which the instruction N is executed.

FIGS. 3A and 3B illustrate the verification process that begins following execution of the instruction in the box 84. The branch is not resolvable (i.e., the "takenness" is not known) until either the execution stage or the WJ stage, depending upon the pipeline in which the branch is executed. Specifically, FIG. 3A shows the method useful when the branch is resolvable in the Ex stage, which may be termed a "D2 to Ex verification method" using the terms that refer to the stages that are checked during verification. FIG. 3B shows a method useful when the branch is not resolvable until the WJ stage, which may be termed a "Ex to WJ verification method". Both methods proceed substantially in parallel in the pipeline.

Beginning with the box 99, the verification process begins for an instruction in the execution stage 18. Beginning in the decision box 100, if the instruction in the execution stage 18 is a non-branch instruction, or a branch instruction that is resolvable in the execution stage, then operation moves to a box 101 in which the D2 to Ex verification process is performed. However, if the instruction in the execution stage is a branch only resolvable in the WJ stage 20, then operation moves to a box 102 in which operation waits until the instruction moves to the WJ stage. Then, operation moves to a box 103, that redirects operation to the Ex to WJ verification method described in FIG. 3B.

Returning to the D2 to Ex verification process in FIG. 3A, if the instruction in the execution stage is a branch instruction resolvable in the execution stage, then operation moves to the decision 104. If the instruction in the execution stage is a taken branch, then operation moves to the decision box 106 in which the address of the instruction following in the pipeline 10 is tested to see if it is equal to the Ex branch target address. If there is a match, then the correct instruction is in the second decode (D2) stage (the previous stage) as illustrated in a box 108 and the verification process can be stopped and normal processing may continue. However if the decision 106 determines that the address following is not equivalent, then processing the instruction in the execution stage continues until finished, and misprediction processing is performed, including fetching the execution branch target, as illustrated in the box 110. In the next box 111, the target instruction is stored in the prefetch buffer set, the pipeline is flushed and history information is updated. Following that, the verification process is complete and normal processing may continue. Returning to the initial decision 104, if the Ex stage instruction is not a taken branch, then operation moves to the decision 112 in which the address of the instruction following the pipeline is tested to see if it is equal to the next sequential Ex instruction. If there is a match, then operation moves to the box 108 in which the correct instruction is in the previous stage, and the verification process is complete. However, if the address of the instruction following in the pipeline is not equal to the next sequential Ex instruction as shown in the box 112, then operation moves to the box 114 in which processing the instruction in the Ex stage is finished, and misprediction processing is performed including fetching the next instruction code. Operation moves to the box 115 in which the next instruction is stored in the prefetch buffer set, the pipeline is flushed, and the history information is updated.

If the branch is not resolved in the execution stage, then the branch instruction passes into the WJ stage in which the results of the calculations are applied to update the processor state. As illustrated in the decision 120, if in the WJ stage the instruction is a taken branch, then a next decision 122 is made to determine whether or not the address of the instruction following in the pipeline 10 is the WJ branch target address. If there is a match, then the correct instruction is in the execution stage as illustrated in a box 124, and the verification process is complete. However if the address is not the same, then as illustrated in the box 126 the execution stage instruction is aborted, the pipeline 10 is flushed, the WJ branch target address is fetched into the prefetch buffer set, the history is updated, and the verification process is complete. More than one cycle may be necessary to complete fetching the instruction into the buffer set, particularly if a memory cycle is necessary to bring the instruction into the code cache 24 which is then supplied to the buffers. Following completion of the verification process, the pipeline 10 continues to process instructions beginning at the instruction in the target address.

However, returning to the decision 120, if the WJ stage instruction is not a taken branch, then in the decision 128, the address of the instruction following in the pipeline 10 is tested to see if it is equal to the next sequential WJ instruction address. If it is equal, then the correct instruction is in the execution stage as illustrated in the box 124. However if the addresses are not the same, then as illustrated in a box 130 the execution stage instruction is aborted, the pipeline 10 is flushed, the next sequential WJ instruction is fetched into the prefetch buffer, and the history is updated. More than one cycle may be necessary to complete fetching the instruction into the buffer set, particularly if a memory cycle is necessary to bring the instruction into the code cache 24 which is then supplied to the buffers. Following that, the verification process is complete and no further verification processing is needed.

In the event that both verification processes (i.e., both the D2 to Ex and the Ex to WJ processes disclosed in FIGS. 3A and 3B) encounter an incorrect instruction sequence, then precedence goes to the Ex to WJ verification process. In that event, the method disclosed in FIG. 3B would be utilized.

Specific Description of Predicting and Verifying a Branch Target Address

The following description is a specific description of a embodiment for predicting and verifying a branch target address, which is implemented in an INTEL microprocessor. However, it will be apparent to one skilled in the art that the principles of the present invention may be implemented in other microprocessor configurations and arrangements, and the invention is not limited to the architecture described herein.

In the preferred embodiment, integer instructions traverse a five-stage integer pipeline. There are five sequential pipeline stages, and a sixth stage which has limited purposes to be described. The five stages of the pipeline include a prefetch (PF) stage, an instruction decode stage (D1), an address generate (D2) stage, an execute-ALU and cache access (Ex) stage, and a writeback (WJ) stage. The sixth stage is a post-writeback (WJJ) stage. These stages are illustrated in FIG. 4, and also in FIG. 6. In other embodiments, a different number of stages may be employed. For example, in a floating point pipeline, there may be several stages following the execution stage.

The preferred embodiment is a superscalar computer capable of executing two instructions in parallel. The two five-stage pipelines operate in parallel to allow integer instructions to execute in a single dock in each pipeline. The pipelines in the preferred embodiment will be termed the "u" and "v" pipes, and the process of issuing two instructions in parallel is termed "pairing". FIG. 4 is a diagram illustrating flow of instructions, denoted by an uppercase "T" and a number. The dotted line separates the u-pipe instruction from the v-pipe instruction. The u-pipe can execute any instruction in the INTEL architecture while the v-pipe can execute "simple" instructions as defined further in the instruction pairing rules to be described below. When instructions are paired, the instruction issued to the v-pipe is the next sequential instruction after the instruction issued to the u-pipe.

The stages of the pipelines will now be described in more detail. The first stage of the pipeline is the prefetch (PF) stage in which instructions are prefetched from an on-chip instruction cache. In the preferred embodiment there are separate caches for instructions and data, and therefore prefetches do not conflict with data references for access to the cache. In the PF stage, there are two independent pairs of line size prefetch buffers, to be described with reference to FIG. 5, that operate in conjunction with the branch target buffer 32 to allow prefetches for one execution path to occur in parallel with execution down another path. The next pipeline stage is the instruction decode (D1) stage in which two parallel decoders decode and issue the next two sequential instructions. The decoder is used to determine whether one or two instructions can be issued, contingent upon the instruction pairing rules to be described. In the preferred embodiment, which is designed to be compatible with prior INTEL microprocessors, an extra clock is required to decode instruction prefixes. Prefixes are issued to the u-pipe at the rate of one per clock without any pairing. After all prefixes have been issued, the base instruction is then issued and paired according to the pairing rules to be stated below. An exception to this is that the preferred embodiment will decode near conditional jumps (long displacement) in the second opcode map in a single clock in either pipeline. The D1 stage is followed by the address generate (D2) stage in which the address of memory resident operands are calculated similar to prior INTEL microprocessors. The execute (Ex) stage of the pipeline is used for both ALU operations and for data cache access. Thus, instructions specifying both an ALU operation and a data cache access will require more than one clock. In the Ex stage, all u-pipe instructions and all v-pipe instructions except conditional branches are verified for correct branch prediction. The fifth stage is the writeback (WJ) stage where instructions are enabled to modify the processor state and complete execution. In this stage v-pipe conditional branches are verified for correct prediction.

As discussed above, the preferred embodiment can issue one or two instructions every dock cycle. Instructions may be paired under the following conditions:

(1) Both instructions in the pair must be "simple" as defined below,
(2) There must be no read-after-write or write-after-write register dependencies between them,
(3) Neither instruction may contain both the displacement and an immediate jump,
(4) Instructions with prefixes (other than OF (in hexadecimal) of JCC instructions) can only occur in the u-pipe.

Simple instructions are defined as those that are entirely hardwired. Simple instructions do not require microcode control and, in general, execute in one clock. Sequencing hardware is used handle instructions with memory resident operands in two or three clocks. A further description of the pairing rules and dependencies is in the patent application filed by Edward T. Grochowski et al. entitled "Microprocessor with Apparatus for Parallel Execution of Instructions", Ser. No. 07/823,881, filed Jan. 23, 1992, which is incorporated by reference herein.

Figure 5:
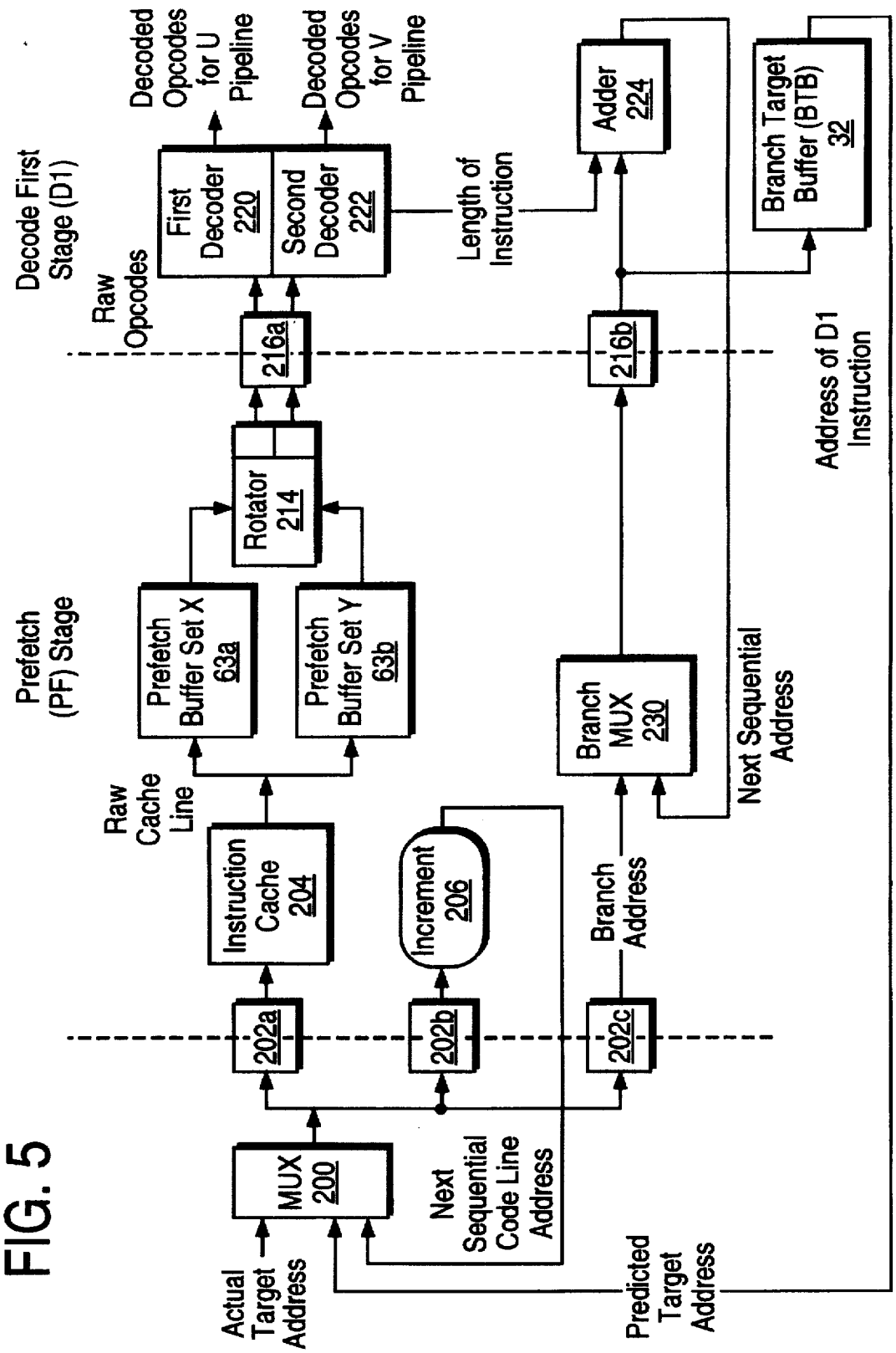
FIG. 5 is a detailed block diagram of the prefetch stage in the first stage decoder.

FIG. 5 is a block diagram illustrating the apparatus for performing the PF stage and the D1 stage. Beginning at the left hand side of FIG. 5, a multiplexer 200 selects between an actual target address, a predicted target address, and a next sequential code line address. The actual target address is supplied by the branch verification apparatus 34 (FIG. 1), the predicted target address is supplied from the branch target buffer 32, and the next sequential code line address is supplied as will be described subsequently. The multiplexer 200 supplies its inputs through the flip-flops 202a, 202b and 202c, which are clocked by the prefetch stage clock as illustrated by a dotted line. The flip-flop 202a applies the output of the multiplexer 200 to the instruction cache 204, in which a plurality of code lines are used to store code information. In the preferred embodiment, code is supplied as instructions only from the instruction cache 204. This can be accomplished within one clock cycle. Thus, if an instruction at given address is needed and it is not already in the cache, it must first be fetched from memory and stored in the instruction cache 204. The flip-flop 202b applies the output of the MUX 200 to an adder 206 which generates the next sequential code line address.

Returning to the instruction cache 204, a raw cache line is supplied to two sets of buffers, a first prefetch buffer set 63a and a second prefetch buffer set 63b. Each set of buffers 63a, 63b includes a pair of 32-byte buffers controlled together to provide a total of 64 bytes in each set. Either set may be selected to supply instruction code to a rotator 214. The rotator 214 is described more fully in the patent application by Edward T. Grochowski, entitled "Rotators in Machine Instruction Length Calculation", Ser. No. 07/831,825, filed Feb. 6, 1992, and another patent application entitled "Two Stage Window Multiplexers for Deriving Variable Length Instructions from a Stream of Instructions", by Edward T. Grochowski et al., Ser. No. 07/831,968, filed Feb. 6, 1992, which are incorporated by reference herein.

The two instructions are applied through the flip-flop 216a to supply raw opcodes to a first decoder 220 and a second decoder 222. The first decoder 220 supplies decoded opcodes for the u-pipe and the second decoder 222 supplies decoded opcodes for the v-pipe.

The decoders 220, and 222 together provide information indicative of the length of the instruction in the decoders 220, 222 to an adder 224. The use of the adder 224 is described by beginning at the tip-flop 202c, which outputs the address supplied by the multiplexer 200. The branch address is applied to a branch multiplexer 230, which selects between the branch address and a next sequential address to be described. The output of the branch multiplexer 230 is supplied to a flip-flop 216b, which is docked with each clock cycle. The output of the flip-flop 216b is applied to the adder 224, and also to the branch target buffer 32. Through the flip-flop 216b, the output of the branch multiplexer 230 is applied within the branch target buffer 32 to ascertain if there is a corresponding entry within the branch target buffer 32. The output of the multiplexer 230 is also applied to the adder 224 through the flip-flop 216b which supplies the next sequential address to the multiplexer 230. In operation, the branch address is selected by the multiplexer 230 following a branch or a request for a new code line by the multiplexer 200.

An explanation of the variable length instructions is useful for understanding and implementing the apparatus described and shown with reference to FIG. 5. In order to be compatible with previous INTEL microprocessors, the instructions provided to the preferred embodiment have a variable length between 1 and 15 bytes. The instructions are furnished in a stream of bytes in which no instruction is differentiated from any other. As a result, the end of the first instruction, the length of which is initially unknown, must be determined in one clock period so that the next instruction may be selected during the next clock period. In order to determine the length of an instruction being processed at any time, previous INTEL microprocessors first decoded the instruction to determine its content. Only after this had been accomplished could the length of the instruction being processed and the starting point for the next instruction in sequence be known and fed back to the prefetch unit. The preferred embodiment incorporates the use of end bit markers for instruction decoding, which are described in the patent application by Edward T. Grochowski et al. entitled "End Bit Markers for Instruction Decode", Ser. No. 07/831, 942, filed Feb. 6, 1992, the specification of which is incorporated by reference herein, now abandoned.

Figure 6A:
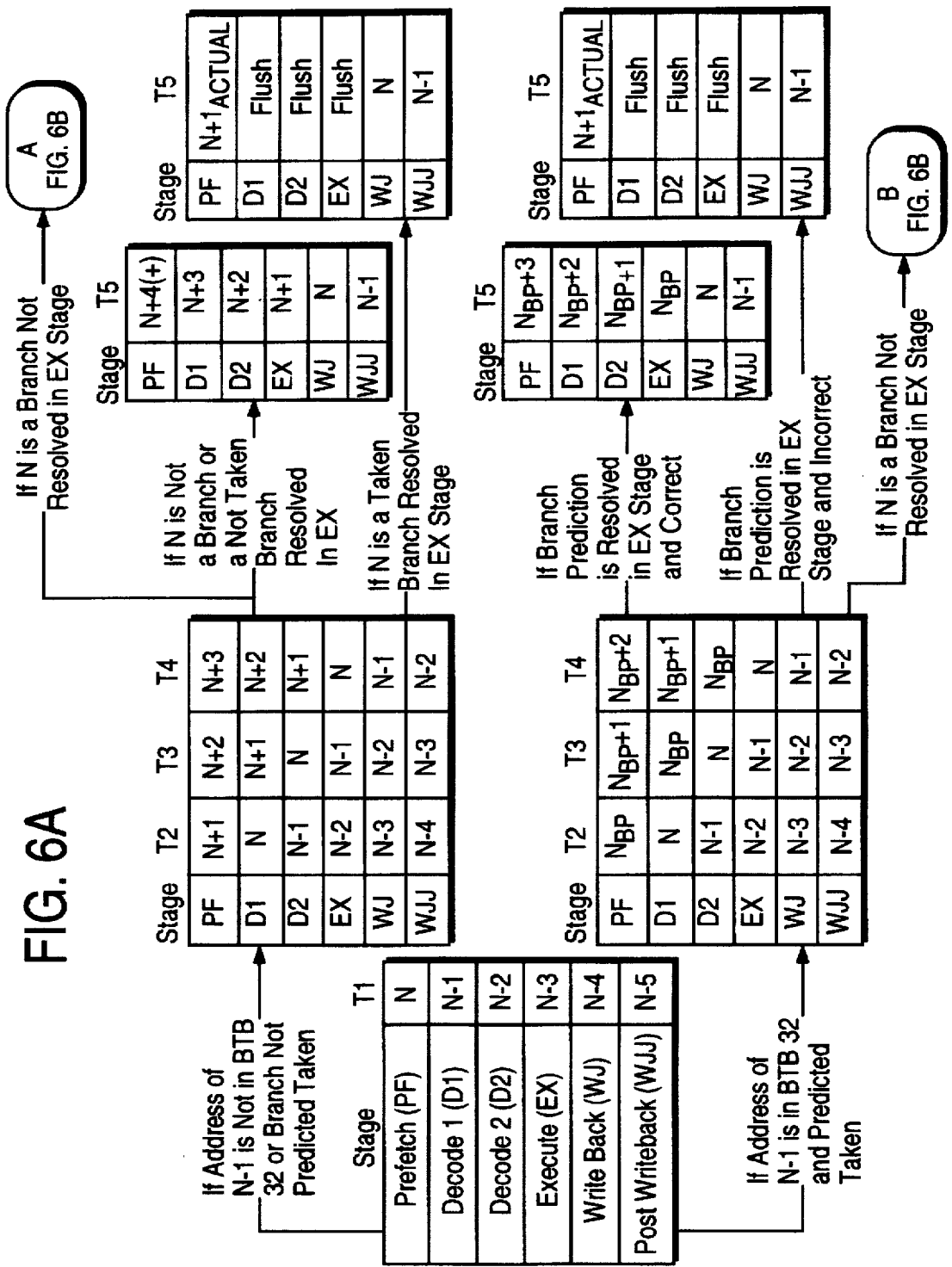
FIGS. 6A and 6B are diagrammatic illustrations of instruction flow under different conditions that may result during operation of the branch prediction and verification apparatus.
Figure 6B:
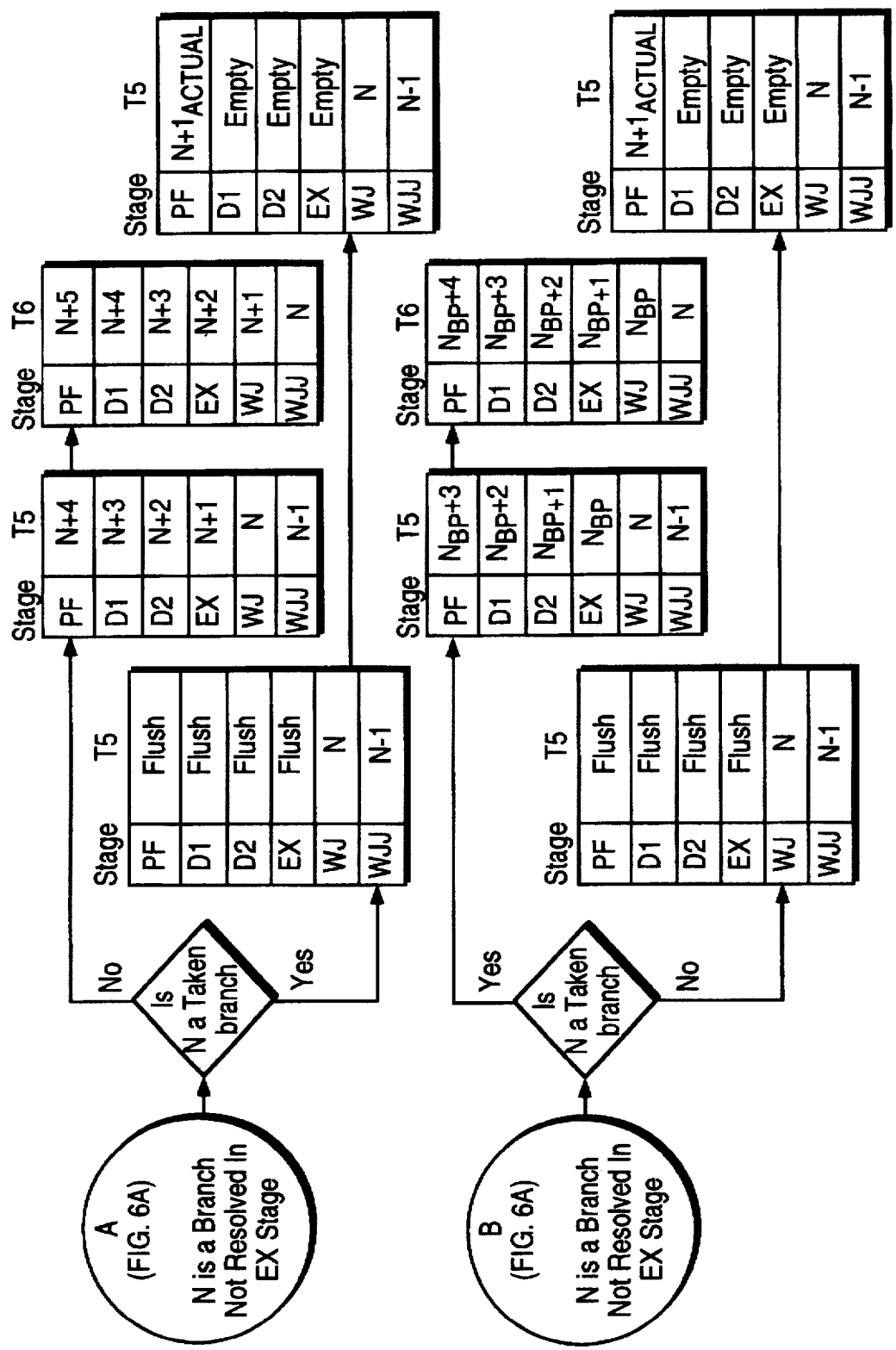

FIGS. 6A and 6B illustrate instruction flow in the preferred embodiment. Beginning on the left, at time T1, the instruction in each of the stages is illustrated. For purposes of this example, the numeral "N" represents a branch instruction. At time T1, the branch instruction N is in the prefetch stage. Also at time T1 the instruction N−1 is in the D1 stage, the instruction N−2 is in the D2 stage, the instruction N−3 is in the Ex stage, the instruction N−4 is in the WJ stage, and the instruction N−5 is in the WJJ stage. Each of these stages has been described previously. Because the preferred embodiment is a superscalar machine, it should also be clear that although this description refers to an "instruction" in each stage, such as instruction N−1, that that instruction actually is an instruction pair in the preferred embodiment, and may be more than two instructions in other embodiments of a superscalar computer.

During the T1 clock cycle, the instruction N−1 in the D1 stage is tested to determine if the branch target buffer 32 has a corresponding entry. Specifically, the address of the instruction N−1 is used as a tag into the branch target buffer 32. The preferred embodiment has two pipelines: a u-pipeline and a v-pipeline. In the preferred embodiment, only the u-pipeline is tested to determine if it holds the address. In the next clock cycle T2, if the address of the instruction N−1 is not in the branch target buffer 32, or if the branch is predicted to be not taken in accordance with the history bits 42 and the branch prediction control apparatus 44 (FIG. 1), then the upper path of FIG. 6A illustrates that operation proceeds with the next sequential instruction N+1. This is illustrated in the clock cycle T2 of the upper path of FIG. 6A, as instruction N+1 going into the prefetch stage. Pipelined operation continues through the clock cycles T3 and T4, in which N is in the Ex stage. Following the cycle T4, if N is a branch not resolved in the Ex stage, then operation moves to FIG. 6B, where the reference numeral "A" designates continued operation, described below in greater detail. If N is not a branch or is not a taken branch resolved in the Ex stage, then the next sequential instruction N+4 is supplied into the PF stage in the next clock cycle T5. However, if instruction N is a taken branch resolved in the Ex stage, the branch verification apparatus 34 (FIG. 1) detects the branch misprediction in clock T4. In the next clock T5, a prefetch is initiated to fetch the correct branch target instruction, $N+1_{ACTUAL}$, into the PF stage and the D1, D2, and Ex stages are flushed.

FIG. 6B illustrates continued operation in the clock cycles T5 and T6. In general there will be a change of instruction flow during times T5 and T6 only if the branch was not resolved in the execution stage, but instead is resolved later in the WJ stage. In FIG. 6B, a reference letter A, from FIG. 6A, illustrates a flow of operation from the upper path of FIG. 6A that will be followed if N is not a branch or not a taken branch resolved in the Ex stage. The decision in FIG. 6A is performed during cycle T5, in which N has moved into the WJ stage. If N is not a branch or the branch is resolved to be a not taken branch, then operation continues so that in the next cycle T6 operation continues, and the next instruction N+5 is brought into the PF stage. However, if the branch instruction N is resolved to be a taken branch, then the branch verification apparatus 34 (FIG. 1) detects the branch misprediction in clock T5, and flushes the stages including the PF, D1, D2, and Ex stages, and a prefetch is initiated to fetch the correct branch target instruction, $N+1_{ACTUAL}$, into the PF stage. In the following cycle T6, the PF stage has the correct target instruction $N+1_{ACTUAL}$, and the D1, D2, and Ex stages are empty. The branch instruction N remains in the WJ stage.

Returning to the cycle T1, if it was determined that the address of the instruction N−1 is in the branch target buffer 32, and the branch is predicted to be taken, then the predicted address from the branch target buffer 32 is supplied into the PF stage. The predicted instruction is identified by "$N_{BP}$". At the next clock cycle T2 the prefetch for $N_{BP}$ is initiated in the PF stage. Instructions then proceed sequentially down the pipeline, fetching the next instruction $N_{BP}+1$ in the time cycle T3, and the next instruction $N_{BP}+2$ in the time cycle T4 in which N is in the Ex stage. If the branch prediction is resolved in the Ex stage, and it is a correct prediction, then the PF stage receives the next sequential instruction $N_{BP}+3$ in the cycle T5, and operation continues. If the branch instruction is resolved in the time cycle T4 but the branch prediction is not correct, a memory cycle is begun in T5 to supply $N+1_{ACTUAL}$, the instruction at the actual target address, and the stages D1, D2, and Ex will be flushed. In this event, a penalty has been paid for the misprediction. However, following the cycle T4, if N is a branch not resolved in the Ex stage, then operation moves to the FIG. 6B, where the reference numeral "B" designates continued operation.

Reference is now made to FIG. 6B, in which the reference letter "B" indicates the flow of instruction from the lower path of FIG. 6A during the time cycles T5 and T6 that is followed if N is a branch instruction resolvable only in the WJ stage. The decision in FIG. 6A is performed during cycle T5, in which N has moved into the WJ stage, and $N_{BP}+3$ has moved into the PF stage. If the branch prediction is correct, then in the next cycle T6 the next sequential instruction $N_{BP}+4$ is brought into the prefetch stage and execution continues. However, if the branch prediction is incorrect, then during cycle T5, the PF, D1, D2, and Ex stages are flushed and a prefetch is initiated to fetch the correct branch target instruction $N+1_{ACTUAL}$ into the PF stage. In the following cycle T6, the PF stage has the correct target instruction $N+1_{ACTUAL}$, and the D1, D2, and Ex stages are empty. The branch instruction N remains in the WJ stage.

Thus, the branch verification hardware has two separate verification methods, depending upon whether the branch is resolved in the Ex stage or the WJ stage. In this context "to resolve" means to determine whether a conditional branch will be taken (thereby altering the control flow), or if the branch will not be taken, letting control flow pass to the next sequential instruction. Conditional branches in the v-pipe can only be resolved in WJ stage since they may be paired with a u-pipe instruction which modifies the flags. All other branches can be resolved in the Ex stage, since the flags could only have been modified by the previous instruction. Unconditional branches and non-branch instructions can also be resolved in the Ex stage, and it is easy to determine whether they are taken or not. For Ex stage resolved branches, the prefetch clock of the branch target overlaps the WJ clock of the branch. For WJ stage resolved branches (i.e., v-pipe conditional branches), the prefetch clock of the target overlaps the WJJ clock of the branch. This optimization affects only the start of misprediction processing; the flush is asserted at the same time for both Ex stage and WJ stage resolved branches.

Figure 7:
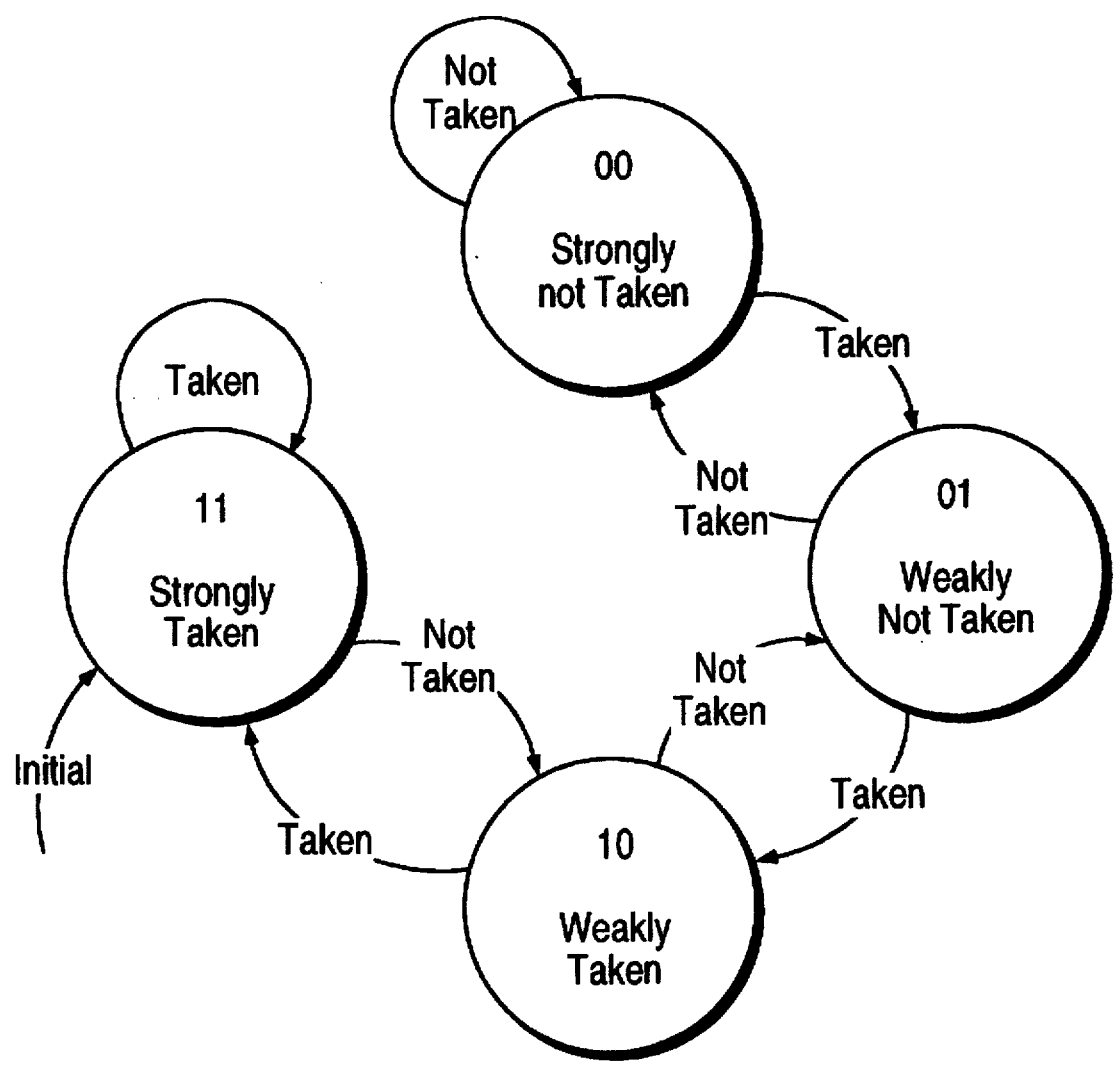
FIG. 7 is a state diagram illustrating operation of the history prediction mechanism.

FIG. 7 is a state diagram of the branch target buffer history bits 42 for each entry in the branch target buffer 32 (FIG. 1) illustrating the history states and how they are selected. The initial entry into the branch target buffer history bits is supplied as illustrated from the bottom of FIG. 7. The initial entry is into state 11, which is the strongly taken state. If the branch is taken in this state, it remains in state 11. However, if from state 11 the branch is not taken, then it moves into the weakly taken state 10. The preferred embodiment of the present invention predicts a branch to be taken if the history bits indicate that the history is weakly taken (state 10) or strongly taken (11). A branch is predicted not taken if the history bits indicate that the history is weakly not taken (state 01) or strongly not taken (state 00).

Thus, within the history bits of each entry in the branch target buffer, a history of the past taken branches in the branch target buffer 32 is maintained. As has been discussed previously, the branch target buffer 32 also associates the linear address of the instruction pair prior to a branch instruction with the linear address of the instruction at the branch target. When a branch is taken and no entry presently exists in the branch target buffer, a new entry is allocated and the history bits are initialized to the strongly taken state 11. As long as the entry remains in the branch target buffer 32, each time the branch is taken the history bits are incremented (not to exceed 11), and each time the branch is not taken the history bits are decremented (not below 00). The branch target buffer is updated when the branch instruction is in the WJ stage.

Since the branch target buffer 32 associates the linear address of the instruction pair prior to the branch with the branch target, the entries placed in the branch target buffer 32 are dependent upon whether one instruction or two are issued. Several exemplary pairings of instructions are shown in the following Appendix A. In each case, the branch target buffer 32 tag is the address of the u-pipe instruction in the instruction pair prior to the branch. Thus, in cases 1 and 3, the tag is the address of the "IMUL" instruction. In cases 2 and 4, the tag is the address of the "ADD" instruction. In all cases, the tagged branch target buffer has stored therein the address of LBL100. To avoid unnecessary interaction between the branch prediction and instruction pairing algorithms, a new entry will not be allocated in the branch target buffer 32 unless the end bit markers are correctly set for both the branch instruction and the instruction pair prior to it (N and N−1, respectively).

Description of Instruction and Data Size Verification

Reference is made to FIGS. 8–11, which show circuitry and methods for implementing instruction verification and segment bit verification. For instruction verification, reference is primarily made to FIGS. 8 and 11. For segment bit verification, reference is primarily made to FIGS. 9, 10A, and 10B. In the following description, reference is made to a single pipeline for illustrative purposes. In the preferred embodiment, a superscalar architecture is employed, with two pipelines. A superscalar architecture can be implemented straightforwardly by repeating the described circuitry and methods by the number of pipelines defined in a given superscalar architecture.

Figure 8:
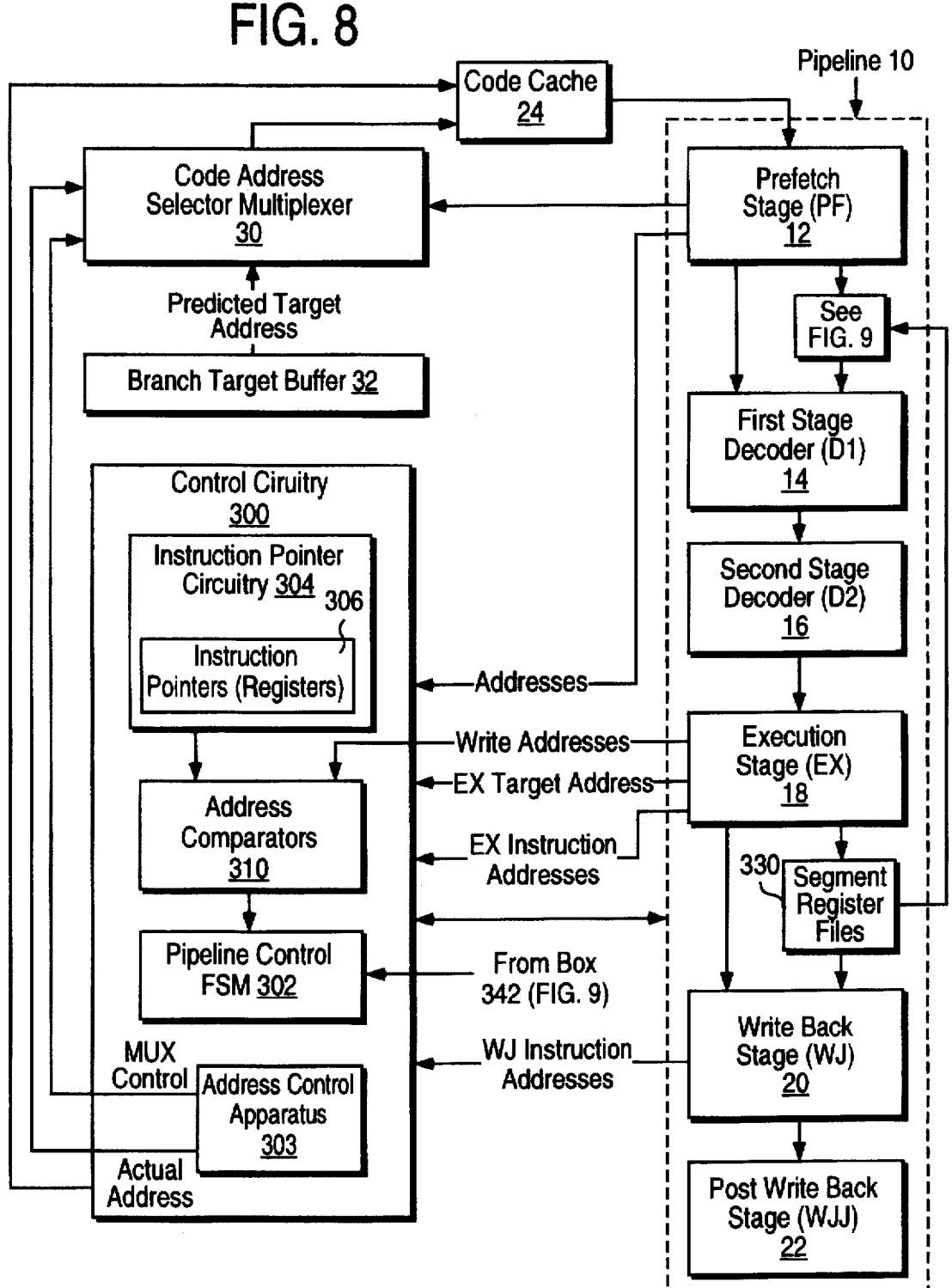
FIG. 8 is a block diagram of the pipeline and control circuitry for predicting and verifying the segment bits, and for verifying that modified code is not in the pipeline.

FIG. 8 illustrates control circuitry 300 which performs a number of control functions including control functions for the pipeline 10. The control circuitry 300 may include the prediction control apparatus 44 and the branch verification apparatus 34 discussed earlier with reference to FIGS. 1 and 2. The control circuitry 300 also includes pipeline control FSM (finite state machine) 302, which includes control logic to flush instructions currently within the prefetch stage 12, the first stage decoder 14, the second stage decoder 16, and the execution stage 18. An address control apparatus 303 controls selecting the next instruction to be prefetched, and also controls sending an actual address of the next instruction to be processed following the flush. The actual address may be supplied from the instruction verification or the segment bit verification methods to be described, or from the branch verification methods described earlier. The actual address may be the next sequential address following the last fully executed instruction. Alternatively, the actual address may be a target address for a branch, as described earlier. The actual address is sent to the code address selector multiplexer 30 which sends it to the prefetch stage 12.

The instruction pointer circuitry 304 maintains instruction pointers 306 corresponding to the instructions in each of the stages. Particularly, the instruction pointer generator 304 receives instruction addresses as they are sent into the first stage decoder 14. As the instructions are passed from stage to stage, the instruction pointer circuitry 304 monitors the passage and updates the instruction pointers 306 to point to the current instruction for each stage. The instruction pointers 306 are available to the address control apparatus 303, which utilizes the addresses therein to determine an actual address.

In the implemented embodiment, the instructions have a variable length, and therefore the specific instruction addresses in the prefetch stage 12 have not been identified because they may be within any of the prefetch buffers. As previously described, in one implemented embodiment, there are four buffers within the prefetch stage 12, each of which has eight bytes. Pointers for each of these buffers are maintained in the instruction pointers 306. An instruction has a variable length between one and fourteen bytes. Because the instruction pointer circuitry 304 knows the addresses of the bytes in the prefetch stage 12, when these code bytes are decoded in the first stage decoder 14 and the length of the instruction is known, the instruction pointer circuitry 304 is able to determine the specific instruction pointer and store it in the instruction pointers 306.

The control circuitry 300 also includes address comparators 310 that compare the address in the instruction pointers 306 with a write address from the execution stage 18. Particularly, the write address is the address of the operand of a write instruction in the execution stage. Depending upon the results of the address comparison, the pipeline control FSM 302 may be utilized to flush the pipeline, in the method described later with reference to FIG. 11. Furthermore, the control circuitry 300 includes conventional circuitry for maintaining the coherency of code cache 24 during jumps, and for rendering the code line invalid, which is also described later with reference to FIG. 11.

Figure 9:
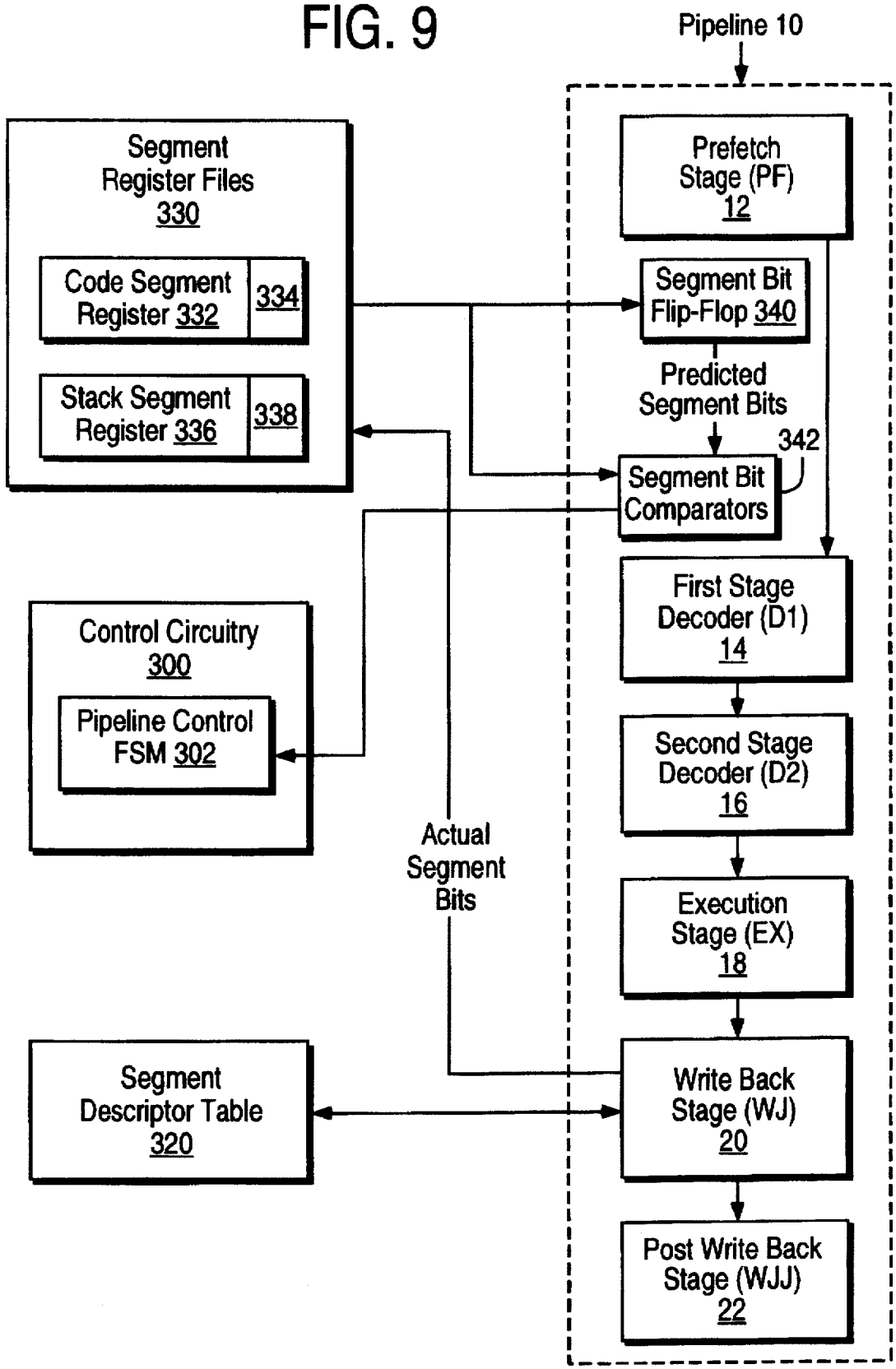
FIG. 9 is a block diagram illustrating control circuitry for segment bit verification.

In the pipeline 10, circuitry is included for segment bit verification. Reference is made to FIG. 9 for illustrating the circuitry for segment bit verification. A "segment bit" is defined as a default segment bit that specifies an operand size, an address size for memory references, or a stack size. The sizes are 16-bit or 32-bit in the preferred embodiment. Memory is divided into segments, and each segment is associated with a number of segment registers that have bits that include default segment bits. A segment descriptor table 320 is used to store a number of segment descriptors for specifying each segment in memory. The segment descriptors include a code segment descriptor having a code segment default bit that specifies the data size of the operands as either 16-bit or 32-bit. The data size is useful for decoding instructions and specifying the address size for memory references. The segment descriptors also include a stack segment register having a stack segment default bit that specifies the size of a stack pointer, thereby specifying the data size of the stack. A more detailed explanation of the segmented memory is set forth in Chapter 5, *Memory Management of the i486™ Processor Programmer's Reference Manual*, 1990, available from INTEL Corporation Literature Sales, P.O. Box 7641, Mt. Prospect, Ill. 60056-7641. Chapter 24, Mixing 16-Bit and 32-Bit Code, includes a detailed explanation of the reasons for mixing 16-bit and 32-bit code, and provides programming guidelines.

Segment register files 330 maintain copies of descriptors for the segment currently being used for processing instructions and data. The segment register files 330 include a code segment register 332 having a code segment default bit 334 and a stack segment register 336 having a stack segment default bit 338. As will be described with reference to FIGS. 10A and 10B, the segment register files 330 are loaded following each instruction's passage from the execution stage 18. The segment bits 334, 338 are applied to a segment bit flip-flop 340 and to segment bit comparators 342, which reside between the PF stage 12 and the D1 stage 14. The segment bit comparators 342 compare the current segment bits 334,338 with the predicted segment bits that were previously clocked into the segment bit flip-flop 340, as will be described in more detail with reference to FIGS. 10A and 10B. Briefly, if the results of the comparison indicate a match, execution is allowed to continue; otherwise, the pipeline 10 is flushed and processing resumes at the address of the flushed instructions. At the next clock cycle, the segment bits 334,338 are clocked into the segment bit flip-flop 340 and become the predicted segment bits. Normally, the current segment bits 334,338 update the predicted segment bits every cycle.

Figure 10A:
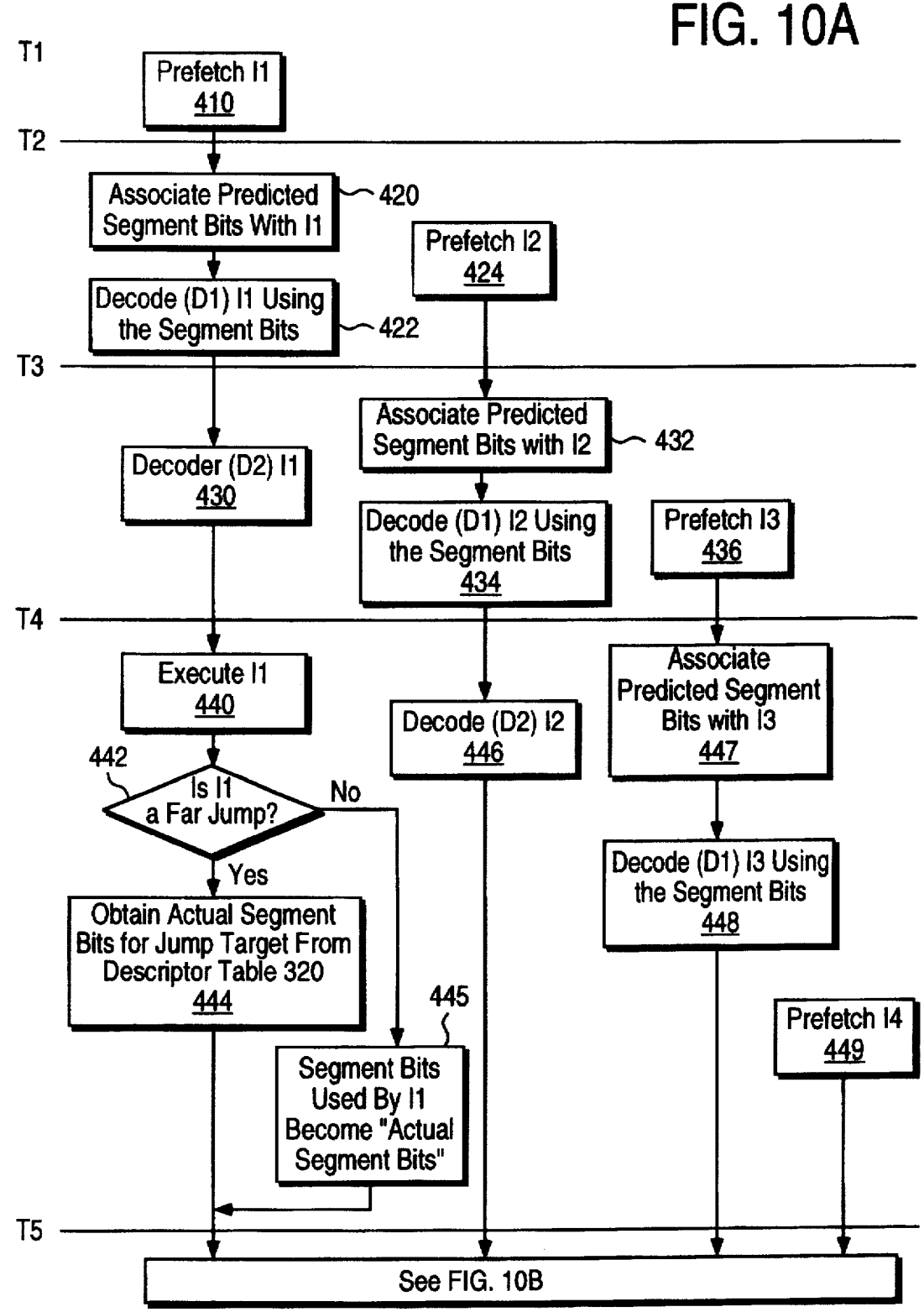
FIGS. 10A and 10B are flow charts illustrating operation of a method to predict segment bits and verify that the correct segment bits have been used in processing instructions.
Figure 10B:
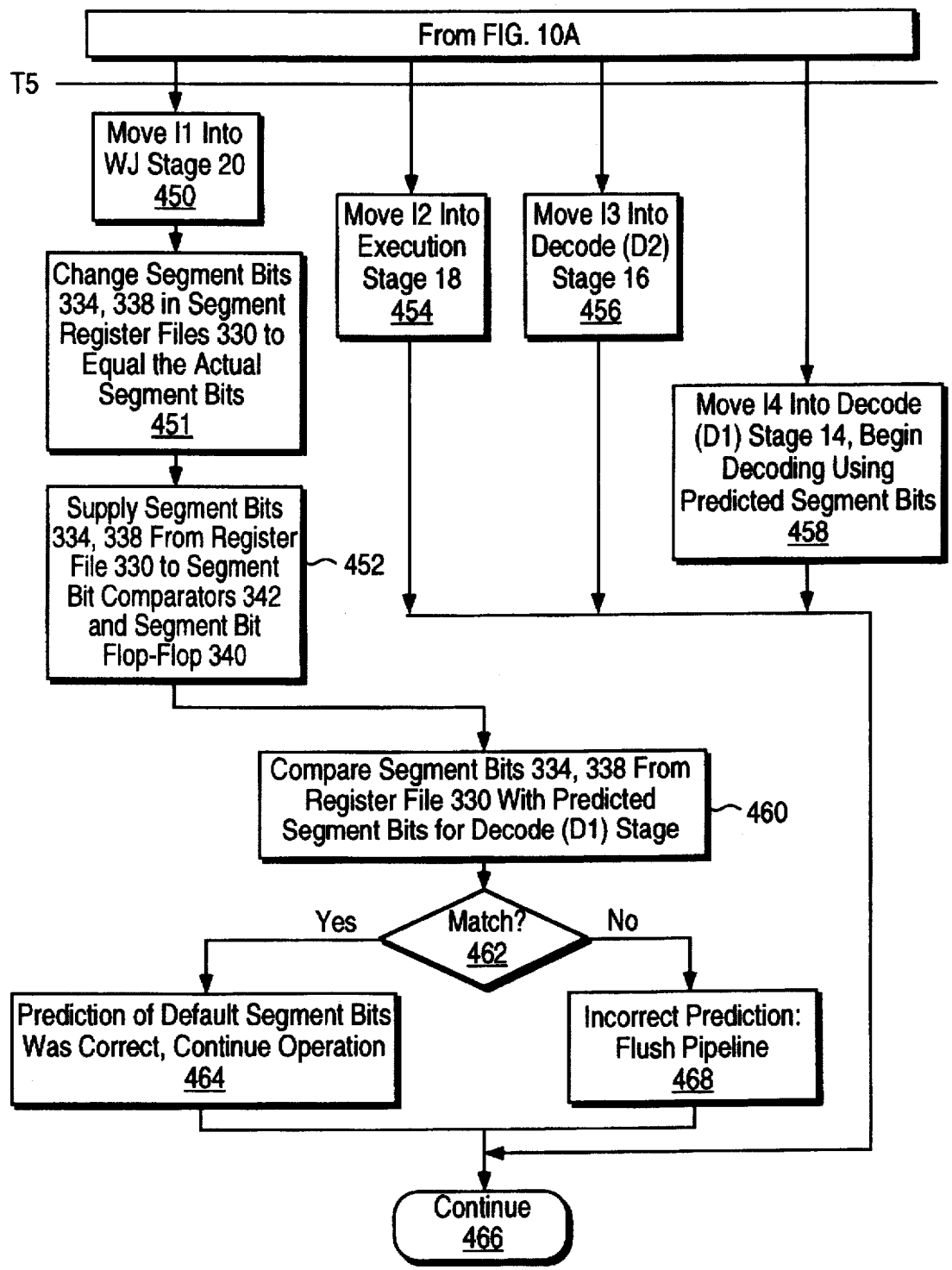

Reference is now made to FIGS. 10A and 10B, which illustrate a method of segment bit verification. Along the left hand side of FIG. 10A and FIG. 10B, the notation "T1" illustrates a time 1. Following that, the notation (T2) followed by the horizontal line indicates a transition between the first cycle and the second. This is useful for illustrating the relative timing of the operations to be discussed. In the time cycle T1, an instruction I1 is prefetched as illustrated in a box 410. Next, in the box 420, the instruction I1 is associated with predicted segment bits and, in that same time cycle T2, as illustrated in a box 422, the instruction I1 is decoded in the D1 stage using the predicted segment bits to determine the operand size, the addressing size for memory references, and the stack size. Also in the time T2, a second instruction I2 is prefetched as illustrated in a box 424.

In the next time T3, the first instruction I1 is in a box 430 in the second decode stage 16. Also in the time T3, the second instruction I2 moves into the box 432 in which it is associated with predicted segment bits and in the next box 434, the second instruction I2 is decoded using the segment bits. Also, a third instruction I3 is prefetched, as illustrated in a box 436.

In the next time T4, the first instruction I1 is executed as illustrated in a box 440. During execution of the first instruction I1, a series of steps are performed to determine whether or not the segment bits should have been changed for the next sequential instruction. A decision is made in a box 442, to determine whether or not the instruction I1 is a far jump. A "far jump" is defined as a transfer of control outside of a particular segment. If instruction I1 is a far jump, then operation moves to a box 444 in which actual segment bits are obtained from the descriptor table 320. However, if instruction I1 is not a far jump, then as illustrated in a box 445, the segment bits that were associated with the instruction I1 become the "actual segment bits". Also in the time T4, the second instruction I2 is decoded as illustrated in a box 446. Furthermore, the instruction I3 is associated with the predicted segment bit as illustrated in a box 447 and the instruction I3 is further decoded in a box 448 using the segment bits. Also, a fourth instruction I4 is prefetched as illustrated in a box 449.

Reference is now made to FIG. 10B which shows operations in the time T5. As illustrated in a box 450, the first instruction I1 is moved into the WJ stage 20. Then, as illustrated in a box 451, the actual segment bits determined in the execution stage are applied to change the segment bits 334,338 in the segment register file 330. It may be noted that the change of segment bits 334, 338 does not in any way affect the execution of instruction I1. Next, as illustrated in a box 452, the segment bits 334,338 that were determined in the time T4 are supplied to the segment bit comparators 342 in the D1 stage 14 (shown in FIG. 9). The segment bits 334, 338 are also supplied to the segment bit flip-flop 340, but they are not clocked into the flip-flop 340 until the next cycle.

Also during the time T4, as illustrated in a box 454, the second instruction I2 is moved into the execution stage 18. As illustrated in a box 456, the third instruction I3 is moved into the D2 stage 16. And as illustrated in a box 458, the fourth instruction I4 is moved into the D1 stage 14, and decoding begins using the predicted segment bits.

As illustrated in a box 460 following from the box 452, the segment bits 334, 338 from the register file 330 are compared with the predicted segment bits. A decision 462 is made based upon the results of the comparison. If the actual segment bits match the predicted segment bits, then operation moves to a box 464 which illustrates that the prediction of the default segment bits was correct and to continue operation. Operation then moves to the box 466 in which operation continues. However, if the results of the comparison in the box 460 indicate that the segment bits do not match, then as illustrated in a box 468, the prediction was incorrect and the pipeline is flushed. In the next cycle, the predicted segment bits are updated, by clocking the segment bit flip-flop 340.

In the preferred embodiment, the operations indicated by the boxes 451, 452, 460, 462, 464, and 468 and performed every cycle, for every instruction that has completed the execution stage. Therefore, in each cycle, the segment register files 330 are updated with actual segment bits, a comparison is made between segment bits from the register files 330 and the predicted segment bits, and in the next cycle, the segment bit flip-flop 340 is clocked to update the predicted segment bits.

It is not required that each stage have an instruction. In the instance when one of the instructions following the first instruction I1 is stalled, the comparisons in the box 460 are performed with whatever predicted segment bits are in the D1 stage 14 following execution of the first instruction I1.

Reference is now made to FIG. 11, which illustrates a method for instruction verification. In a box 500, a write instruction is supplied and decoded. Such instructions are often encountered in streams of instructions being executed by a computer. In a box 502, the write instruction is moved into the execution stage 18. Then, operation moves in parallel in two directions. In one direction, a box 504 illustrates that the coherency of the code cache 24 is maintained, which can be accomplished by conventional methods, for example by snooping the cache 24 and rendering the line invalid if a match is found. In the other direction from the box 504, operation moves to the box 512 in which the address of the operand of the write instruction is compared with the addresses of each of the instructions in preceding stages. As discussed previously, these instruction addresses are stored in the instruction pointers 306 of FIG. 8.

Next, operation moves to the decision 514 which queries the results of comparison in the operation 512, specifically whether any of the instruction addresses in the preceding stages match the addresses of the write instruction. If there was a match, then the instruction code may have been modified by the write instruction. However, if there were no matches, then the code has not been modified by the write, as illustrated in the box 518. Next, as illustrated in a box 520, the write instruction is moved out of the EX stage. Furthermore, the next instruction following is moved into the EX stage. Then operation moves to a decision 522. If the code may have been modified, then operation moves to a box 524 in which the pipeline is flushed by the pipeline control FSM 302 (FIG. 8). Operation then continues as illustrated in a box 526. However if the code has not been modified, then operation moves from the decision 522 to the continue box 526.

In the box 512, a comparison is made between the addresses of the operands of the write instructions and the addresses of the instruction in each preceding stage. However, due to the peculiarities of the implemented embodiment, the starting address of individual instructions in the prefetch stage 12 are not known precisely, due to the variable length of the instructions which has not yet been determined. Furthermore, an instruction may span two cache lines. In the preferred embodiment, comparison is done on a two-cache line basis, which is equivalent to 64 bytes. Therefore, if the write address is within 64 bytes of any address in the prefetch stage 12, the first stage decoder 14, and the second stage decoder 16, then a match will be determined in the decision 514. Before performing the comparisons, the lowest five bits (bits 0–4) are dropped from the write address and the instruction addresses. A comparator then provides a one line comparison. Before comparing the second line, a "one" is added to the write address, and the second line is compared. Thus, a superset of the write addresses is detected.

The invention may be embodied in other specific forms without departing from its spirit or essential characteristics. In the previous discussion, for explanatory purposes, a single pipeline was described. In the preferred embodiment, a superscalar architecture is employed, with two pipelines. Application of the invention to a superscalar architecture is straightforward, and can be accomplished by repeating the circuitry appropriately. The described embodiment is to be considered in all respects only as illustrative and not restrictive and the scope of the invention is, therefore, indicated by the appended claims rather than by the foregoing descriptions. All changes which come within the meaning and range of equivalency of the claims are to be embraced within their scope.

Appendix A

|  |  | U-pipe | V-pipe |
|---|---|---|---|
| Case 1: | N − 1: | imbul ebx,ecx | (empty) |
|  | N: | jnz lb1100 | (empty) |
|  | N + 1: | lb1100: mov eax,ebx |  |
| Case 2: | N − 1: | add esi,10 | cmp eax,2 |
|  | N: | jnz lb1100 | (empty) |
|  | N + 1: | lb1100: mov eax,ebx |  |
| Case 3: | N − 1: | imul ebx,ecx | (empty) |
|  | N: | cmp eax,2 | jnz lb1100 |
|  | N + 1: | lb1100: mov eax,ebx |  |
| Case 4: | N − 1: | add edi,10 | sub esi,10 |
|  | N: | cmp eax,2 | jnz lb1100 |
|  | N + 1: | lb1100: mov eax,ebx |  |

What is claimed is:

1. A method for processing self-modifying code in a pipelined computer processor having a plurality of stages for simultaneously processing a stream of instructions in a pipeline, comprising the steps of:

(a) executing an in order write instruction in an execution stage to write data to a write address;

(b) comparing the write address with an address of each instruction in the pipeline that is subsequent to said write instruction to determine if the write address matches any of said addresses;

(c) if said comparisons do not find a match, then continuing operation; and (d) if any of said comparisons find a match, then performing the steps of
  flushing each of said instructions in the pipeline following the write instruction, and
  pre-fetching the locations of said flushed instructions for decoding and execution.

2. The method of claim 1 wherein, in step (b), a match is determined if the write address is within a predetermined number of bytes from any of the instruction addresses in the pipeline.

3. The method of claim 1, wherein following said steps (a) and (b), the write instruction completes execution before said steps (c) and (d).

4. A method for processing a stream of instructions in a pipelined computer including branch prediction and segmented memory, including the steps of:

a) predicting a branch address to an undetermined memory segment;

b) prefetching at least one predicted instruction at said branch address;

c) predicting segment bits of said predicted instruction to be the same as the segment bits associated with the branch instruction immediately preceding the predicted instruction;

d) decoding said predicted instruction using said predicted segment bits;

e) during execution of said branch instruction, determining actual segment bits for said predicted code; and f) comparing said actual segment bits with said predicted segment bits, and performing the steps of
  if said actual segment bits are equivalent to said predicted segment bits, then continuing operation, and if said actual segment bits are not equivalent to said predicted segment bits, then flushing the pipeline and re-decoding and re-executing said predicted code using said actual segment bits.

5. The method of claim 4, wherein said segment bits specify one of at least two data sizes for operands, address modes, and stack pointers, said data sizes including a first data size of a first length and a second data size of a second length.

6. The method of claim 4 wherein the segment bits include a segment bit to define operand size of the instruction associated therewith, so that said step (c) includes decoding the first instruction with a predicted operand size.

7. The method of claim 4 wherein the segment bits include a segment bit to define address size for memory references by the instruction associated therewith, so that said step (c) includes decoding the first instruction with a predicted address size.

8. The method of claim 4 wherein the segment bits include a segment bit to define stack size for the instruction associated therewith, so that said step (c) includes decoding the first instruction with a predicted stack size.

9. The method of claim 4 wherein the segment bits include a code segment bit to define operand size and address size for the instruction associated therewith, so that said step (c) includes decoding the first instruction with a predicted operand size and address size.

10. The method of claim 9 wherein the segment bits further include a stack segment bit to define stack size for the instruction associated therewith, so that said step (c) further includes decoding the first instruction with a predicted stack size.

11. The verification method of claim 4 including following said step (e), storing the actual segment bits in a segment register file; and said step (f) includes comparing the segment bits in the segment register file with the predicted segment bits.

12. A computer circuit for handling branch predictions in an instruction code that allows self-modifying code in a pipelined microprocessor having a prefetch stage for fetching and buffering instruction code lines from a computer memory, a decode stage coupled to the prefetch stage for receiving instruction code and decoding it into one or more instructions, and an execution stage, said microprocessor having a segmented memory, comprising:

a branch prediction circuit for predicting a branch address responsive to a branch instruction;

a segment prediction circuit for predicting segment bits for a predicted instruction;

a branch instruction execution circuit in said execution stage for determining an actual target address and actual segment bits responsive to a branch instruction;

segment register files holding actual segment bits received from said branch execution circuit;

segment bit comparators for comparing predicted segment bits with the actual segment bits from the segment register file;

a write address circuit, responsive to a write instruction in said execution stage, for supplying a write destination address;

instruction pointer registers for holding current addresses of the instructions in prefetch stage, the decode stage, and the execution stage;

write address comparators for comparing the addresses in said instruction pointer registers with said write destination address; and address control means, responsive to said address comparators and said segment bit comparators, for either continuing processing the instructions currently in said pipeline, or selecting an address to be prefetched.

13. The computer circuit of claim 12 further comprising:

a pipeline control circuit, responsive to said write address comparators and said segment bit comparators, for flushing the pipeline if either said write address comparators match or said segment bit comparators do not match.

14. The computer circuit of claim 12 further comprising a second pipeline, so that the microprocessor has a superscalar architecture.

15. The computer circuit of claim 12 further comprising:

a descriptor table for holding descriptor data that describes the data within said segments, said descriptor data including default segment bits indicative of a default data size for a selected segment, the default data sizes including a first data size having a first length and a second data size having a second length.

* * * * *

UNITED STATES PATENT AND TRADEMARK OFFICE
CERTIFICATE OF CORRECTION

| | | |
|---|---|---|
| PATENT NO. | : | 5,692,167 |
| DATED | : | November 25, 1997 |
| INVENTOR(S) | : | Grochowski et al. |

It is certified that error appears in the above-identified patent and that said Letters Patent is hereby corrected as shown below:

In column 2 at line 28 delete "dock" and insert --clock--

In column 2 at line 32 delete "dock" and insert --clock--

In column 4 at line 30 delete "dock" and insert --clock--

In column 4 at line 49 delete "dock" and insert --clock--

In column 11 at line 7 delete "dock" and insert --clock--

In column 12 at line 60 delete "docked" and insert --clocked--

In column 13 at line 15 delete "dock" and insert --clock--

In column 17 at line 41 delete "docked" and insert --clocked-- o
In column 17 at line 47 delete "docked" and insert --clocked--

In column 18 at line 36 delete "docked" and insert --clocked--

UNITED STATES PATENT AND TRADEMARK OFFICE
CERTIFICATE OF CORRECTION

PATENT NO. : 5,692,167
DATED : November 25, 1997
INVENTOR(S) : Grochowski et al.

It is certified that error appears in the above-identified patent and that said Letters Patent is hereby corrected as shown below:

In column 18, at line 64 delete "docked" and insert --clocked--

Signed and Sealed this

Tenth Day of March, 1998

Attest:

BRUCE LEHMAN

Attesting Officer          Commissioner of Patents and Trademarks